US011270326B2

(12) United States Patent
Wu et al.

(10) Patent No.: US 11,270,326 B2
(45) Date of Patent: Mar. 8, 2022

(54) PRICE OPTIMIZATION SYSTEM

(71) Applicant: Oracle International Corporation, Redwood Shores, CA (US)

(72) Inventors: Su-Ming Wu, Waltham, MA (US); Andrew Vakhutinsky, Sharon, MA (US); Setareh Borjian Boroujeni, Burlington, MA (US); Santosh Bai Reddy, Burlington, MA (US); Kiran V. Panchamgam, Burlington, MA (US); Sajith Vijayan, Burlington, MA (US); Mengzhenyu Zhang, Ann Arbor, MI (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 160 days.

(21) Appl. No.: 16/380,185

(22) Filed: Apr. 10, 2019

(65) Prior Publication Data

US 2020/0342475 A1    Oct. 29, 2020

(51) Int. Cl.
*G06Q 30/02* (2012.01)
*G06F 17/17* (2006.01)
*G06Q 10/06* (2012.01)

(52) U.S. Cl.
CPC ......... *G06Q 30/0206* (2013.01); *G06F 17/17* (2013.01); *G06Q 10/067* (2013.01); *G06Q 30/0202* (2013.01); *G06Q 30/0204* (2013.01)

(58) Field of Classification Search
None
See application file for complete search history.

(56) References Cited

U.S. PATENT DOCUMENTS 7,979,299 B1 * 7/2011 Mehta ................ G06Q 30/0201
705/7.29
2010/0250329 A1 9/2010 Sanli et al.
(Continued)

FOREIGN PATENT DOCUMENTS

GB          2407184 A  *  4/2005  ............. G06Q 10/10

OTHER PUBLICATIONS

Juan Li et al., Managing Inventories in Multi-echelon On-line Retail Fulfillment System with Different Response Lead Time Demands, 2014, 2014 IEEE Symposium on Computational Intelligence in Production and Logistics Systems (CIPLS) (Year: 2014).*

*Primary Examiner* — Jerry O'Connor
*Assistant Examiner* — Matthew H Divelbiss
(74) *Attorney, Agent, or Firm* — Potomac Law Group, PLLC

(57) ABSTRACT

Embodiments determine a price schedule for an item by, for each item, receiving a set of prices for the item, an inventory quantity for the item, a per-segment demand model for the item, and an objective function that is a function of the per-segment demand model and maximizes revenue based at least on a probability of a return of the item and a cost of the return. Embodiments allocate the inventory quantity among a plurality of customer segments based at least on a predicted contribution of each customer segment to the objective function. Embodiments determine a markdown portion of the price schedule for the item that maximizes the objective function, where the markdown portion assigns a series of prices selected from the set of prices for respective time periods during a clearance season for the item.

20 Claims, 8 Drawing Sheets

(56) References Cited

U.S. PATENT DOCUMENTS

2014/0214492 A1* 7/2014 Bergerson .............. G06Q 40/06
                                                            705/7.35
2017/0200104 A1  7/2017 Kannan et al.
2017/0200180 A1* 7/2017 Kannan ................ G06Q 10/087

* cited by examiner

PRICE OPTIMIZATION SYSTEM

FIELD

One embodiment is directed generally to a computer system for determining product pricing, and in particular to a computer system that determines product pricing promotion and markdown schedules.

BACKGROUND INFORMATION

For a retailer or any seller of products, at some point during the selling cycle a determination will likely need to be made on when to markdown the price of a product, possibly through promotions, and how much of a markdown to take. Price markdowns can be an essential part of the merchandise item lifecycle pricing. A typical retailer has between 20% and 50% of the items marked down (i.e., permanently discounted) and generates about 30-40% of the revenue at marked-down prices.

A determination of an optimized pricing markdown maximizes the revenue by taking into account inventory constraints and demand dependence on time period, price and inventory effects. An optimized markdown can bring inventory to a desired level, not only during the full-price selling period, but also during price-break sales, and maximize total gross margin dollars over the entire product lifecycle. However, price optimization systems typically attempt to determine prices to maximize short-term revenue or short-term profit. These systems generally do not take into account after sale factors such as whether a product will later be returned by a customer.

SUMMARY

Embodiments determine a price schedule for an item by, for each item, receiving a set of prices for the item, an inventory quantity for the item, a per-segment demand model for the item, and an objective function that is a function of the per-segment demand model and maximizes revenue based at least on a probability of a return of the item and a cost of the return. Embodiments allocate the inventory quantity among a plurality of customer segments based at least on a predicted contribution of each customer segment to the objective function. For each customer segment, based at least on a quantity of inventory allocated to the customer segment, embodiments determine a promotion portion of the price schedule that maximizes the objective function, where the promotion portion assigns to the item a series of prices selected from the set of prices for respective time periods during a regular season for the item. Embodiments aggregate a quantity of remaining inventory allocated to the plurality of customer segments at an end of the regular season. Based at least on the aggregated inventory, embodiments determine a markdown portion of the price schedule for the item that maximizes the objective function, where the markdown portion assigns a series of prices selected from the set of prices for respective time periods during a clearance season for the item and combine the promotion portion and the markdown portion to create a price schedule for the item.

DETAILED DESCRIPTION

Figure 1:
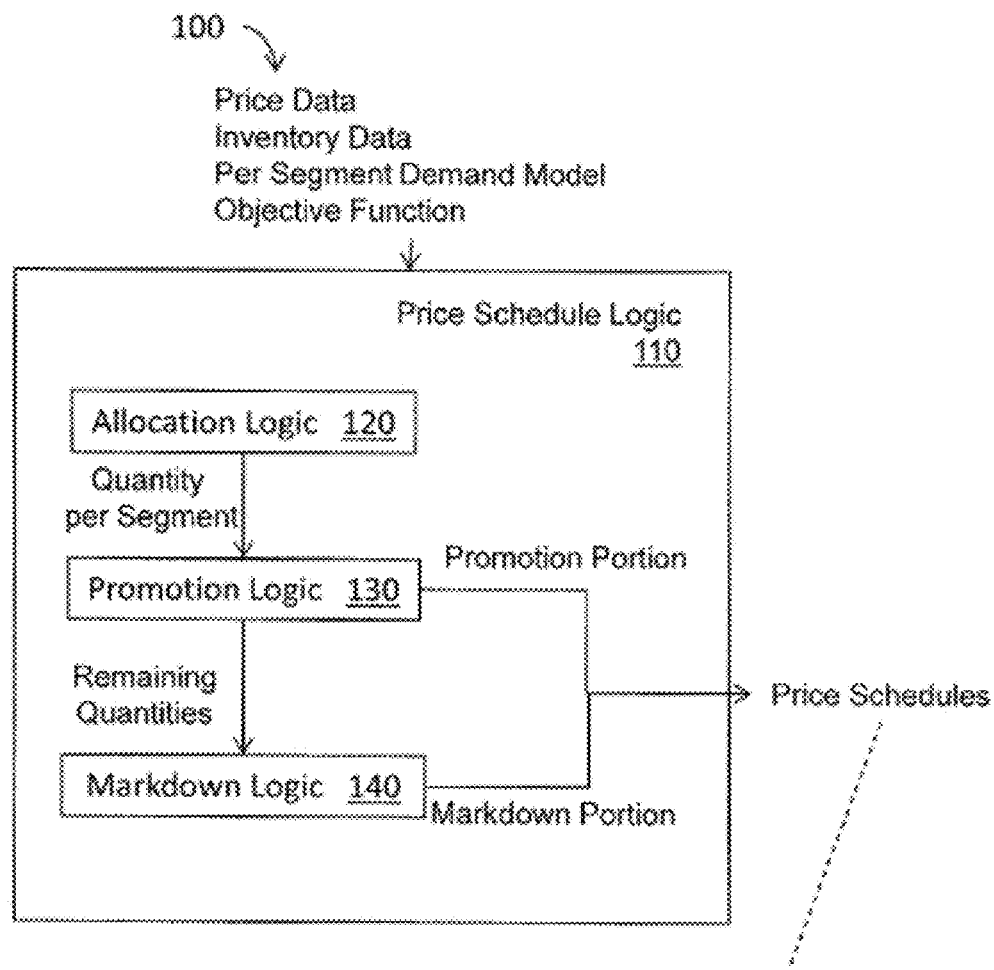
FIG. 1 illustrates a computerized system that generates a price schedule for a set of items in accordance with one embodiment.

One embodiment is a price optimization system that determines pricing by accounting for the probability that a customer will later return a product. Therefore, the optimized pricing, in addition to other factors, also minimizes the probability of return which increases longer term profit. Embodiments account for this probability by trading off the increased revenue from increasing prices against the increased probability of return that would result from the price increases. An increased probability of return not only means losing the revenue associated with the original sale but also incurring the cost of processing the return.

As discussed above, known price optimization systems for retailers typically focus on adjusting prices and giving promotions that will get customers to make purchases at a price that maximizes the retailer's revenue or profit. The focus is simply on selling particular products/items, without concern for whether the customer might return the item. For example, charging the customers a higher price might improve revenue in the short term at the expense of making it more likely that the customer returns the merchandise. The retailer incurs cost in dealing with the return, and known price optimization systems do not account for this possible cost, and only set prices to increase immediate revenue or profit.

Some online retailers have tried to decrease the cost of returns by offering discounts if a customer agrees not to return the merchandise. However, most retailers, especially for in-store purchases, have not tried to affect returns through pricing.

Typically, retailers have tried to make handling of returns more efficient rather than trying to decrease returns in the first place. For example, they may have tried to transfer returned merchandise to a different store where it might sell better than at the store where the return was received, or they might have simply priced the returned merchandise very low in order to get rid of it quickly. Thus, they simply accepted that they could not control whether the customer returned merchandise, and focused instead on handling returns as efficiently as possible. Similarly, known price optimization systems have focused on adding the returned merchandise to inventory and then selling the increased inventory at the best price. This is certainly better than not accounting for the increased inventory due to returns at all, but not as beneficial as decreasing returns in the first place.

In contrast to known systems which use maximization to optimize prices simply to get customers to make purchases, embodiments of the invention combine this maximization with giving discounts to a customer in order to decrease the customer's probability of returning the merchandise. The discount is based on a model of customer behavior that relates several factors, including the price paid, to the probability of the customer returning the merchandise. Embodiments balance giving this discount against the possible decrease in revenue or profit, choosing a price which will decrease the probability enough to make it worth the decrease in revenue or profit. When the probability is reduced enough, the costs to the retailer associated with handling a return are also decreased, and this can make up for the decrease in revenue or profit.

With embodiments, the discount can be given to the customer immediately at the register (or at online checkout) or as a rebate, or as "points" that the customer can use later, similar to how credit card points operate.

Embodiments use a model of consumer behavior that relates several factors, including the price paid for the merchandise, to the probability of return. For example, among the other factors are the type of merchandise and the time of year when it was purchased, and the number of returns the customer (or other customers) did for this type of merchandise. Embodiments iterate through the historical transactions of sales and returns of the retailer to determine the effect on return probability of each of these factors. Then, price optimization forecasts the probability of return during optimization by employing this model, and adjusts prices accordingly.

In addition, the model in accordance to embodiments can also account for the customer segment of the customer, if the retailer has customer segments. This can improve the accuracy of the model, since different segments of customers may have different returns behavior.

With embodiments, the discount can be given to a customer in one of two ways: (1) If the customer can be identified, for example through a loyalty card or because the purchase is online and the customer has logged in, then the discount is tailored to the customer segment that the customer belongs to; (2) If the customer cannot be identified, because, for example, the customer is at the register and is not part of the retailer's loyalty program, the discount can be determined by treating the customer as being randomly chosen from any of the segments.

As disclosed above, retailers, particularly with short-life cycle merchandise such as apparel, use promotions and markdowns to move inventory and maximize profits in a manner that clears the merchandise by the end of the selling system. Determining when to schedule promotions and markdowns and what prices should be assigned to merchandise during promotions and markdowns is a challenging problem for a retailer. In addition, a retailer often has business rules such as a maximum number of items that can be assigned promotion prices at the same time, that constrain the price schedule for each item. Further, different customer segments (e.g., single people, young people, parents, retirees, and so on) respond differently to promotions and markdowns, a fact which should be captured in the price scheduling process. Considering that many retailers have hundreds of different items each season, it can be seen that even a computerized approach to setting a price schedule for the items sold by a retailer can become infeasible.

Embodiments provide a computerized promotion and markdown scheduling for a large number of items in an efficient manner that takes into account a probability of return of each item. A different promotion schedule is created for different customer segments to leverage knowledge about the buying habits of different types of customers and maximize profits. The promotion portion of the schedule (i.e., regular season) and the markdown portion of the schedule (i.e., clearance season) are both computed at the same time by embodiments, allowing a retailer to consider different promotion and markdown approaches.

FIG. 1 illustrates a computerized system 100 that generates a price schedule for a set of items in accordance with one embodiment. The price schedule is, for example, a data structure stored in memory that contains data values and/or records for information as described herein. System 100 includes price schedule logic 110 that controls a processor to perform various operations disclosed below. In one embodiment, price schedule logic 110 is implemented as computer instructions embodied in a module stored in a non-transitory computer storage medium where the instructions are configured as an executable algorithm configured to perform the functions as described herein when executed by at least the processor of a computing device.

Price schedule logic 110 interacts by way of electronic communication over network or internet connection with a computing device of a retailer. The term "retailer" or "requesting device" is intended to include a computing device under the control of a retailer who prices items for sale and who is requesting, from system 100, a price schedule for items sold by the retailer. Price schedule logic 110 is configured to receive electronic communications from the remote computing device of the retailer that communicates price data for items, inventory data for the items, a per-segment demand model for the items, and a selected objective function.

The price data defines a set of prices that are to be considered for each item. The set of prices includes the regular price, promotion prices, and markdown prices for the item. In one embodiment, the promotion prices and the markdown prices are separated into two sets, neither of which includes the regular price for the item, to simplify the calculations in the promotion and markdown seasons. Sometimes the set of prices is referred to as the "price ladder" for an item. In one embodiment, cost data for each item is also input by price schedule logic 110 for use in calculating profits.

Inventory data includes an "inventory quantity" which, for the purposes of this description, includes the initial inventory quantity of an item that will be on hand at the beginning of the regular season and, optionally, scheduled shipments of the item to replenish the stock during the regular season. To input or receive price and inventory data for a set of items, price schedule logic 110 may query a database that stores such data (e.g., electronic records encoding price ladders and inventory and replenishment quantities).

The per-segment demand model may be provided by the retailer or otherwise accessible to price schedule logic 110. In one embodiment, the per segment demand model is the "scan-pro" model. In one embodiment, the per-segment demand model is a stored set of instructions that, when executed by a processor, computes demand for an item based on the price of the item and other factors such as elasticity, promotion fatigue, seasonality, and so on. The per-segment demand model includes different demand parameter values for different customer segments. One example per-segment demand model will be described in detail below, however, it is to be understood that any demand model can be used in embodiments, including demand models that do not differentiate between different customer segments. In one embodiment, the retailer furnishes values for demand parameters based on their own sales histories and experience. In other embodiments, price schedule logic 110 stores and maintains the per-segment demand model or obtains the per-segment demand model and parameter values from a different source.

The objective function defines the sales-related quantity that the retailer seeks to maximize. Example objective functions include profit and revenue. Embodiments provide a novel objective function that also accounts for how a price change may affect the probability of the customer returning an item, and the corresponding effect on profits.

Price logic 110 is configured to generate a price schedule that includes a promotion portion and a markdown portion. The price schedule assigns to the item a series of prices selected from the set of prices for respective time periods (e.g., weeks or days) during a regular season and also a clearance season for the item. A price schedule for an item is generated for each customer segment. Example price schedules for a "singles" customer segment and a "moms" customer segment are shown in FIG. 1. It can be seen that the price schedule is different for the two customer segments during the "regular/promotion" portion of the price schedule, while the price schedule is the same for the two customer segments during the "clearance/markdown" portion of the price schedule. Price schedule logic 110 is configured to transmit, by way of a network connection, the price schedules to the retailer for use in pricing the item.

The promotion and markdown schedule problem increases proportionally when customer segments are taken into account. One of the challenges to performing per-segment promotion and markdown scheduling is that the different customer segments share the same inventory. Another challenge is that the markdown policies are typically the same across all customer segments while per-segment promotion pricing can be achieved by targeted marketing. Price schedule logic 110 includes allocation logic 120, promotion logic 130, and markdown logic 140 that together cooperate to address these challenges using a multi-phase process to generate the promotion and markdown portions of the price schedule.

Allocation logic 120 is configured to allocate the inventory quantity (e.g., initial inventory and, optionally, replenishment quantities) among a plurality of customer segments based at least on a predicted contribution of each customer segment to the objective function. By allocating the inventory to each customer segment prior to performing the promotion price determination for each customer segment, the link between the customer segments is broken, greatly simplifying the process of generating the promotion portion and the markdown portion of the price schedule.

For example, a purse may be sold to three different customer segments: single women, mothers, and retirees. The per-segment demand model specifies the particular behaviors of these different types of customers by including different demand parameter values for each segment. Allocation logic 120 is configured to predict a contribution each customer segment to the objective function. In one embodiment, based on the per-segment demand model, allocation logic 120 may determine that: (1) when all the inventory quantity is allocated to the single women segment, $1200.00 in revenue (i.e., objective function) will be generated; (2) when all of the inventory quantity is allocated to mothers, $1000.00 in revenue will be generated; and (3) when all of the inventory quantity is allocated to retirees, $300.00 in revenue will be generated. Allocation logic 120 allocates the inventory quantity to the different customer segments based on this predicted contribution (e.g., 1200/(1200+1000+300) or 48% of the inventory quantity is allocated to the single women customer segment, and so on). In other embodiments, other methods of predicting the contribution of each customer segment to the objective function are used.

Promotion logic 130 is configured to determine the promotion portion of the price schedule. For each customer segment, based the quantity of inventory allocated to the customer segment, promotion logic 130 is configured to determine the promotion portion of the price schedule that maximizes the objective function. The promotion portion assigns to the item a series of prices selected from the set of prices for respective time periods during the regular season for the item.

Markdown logic 140 is configured to aggregate a quantity of remaining inventory in each customer segment at the end of the regular season. Markdown logic 140 is configured to, based at least on the aggregated inventory, determine a markdown portion of the price schedule for the item that maximizes the objective function. The markdown portion assigns a series of prices selected from the set of prices to the item for respective time periods during the clearance season for the item. Price logic 110 combines the promotion portion and the markdown portion for each customer segment to create the price schedule for the customer segment.

In one embodiment, system 100 is a computing/data processing system including an application or collection of distributed applications for enterprise organizations. The applications and computing system 100 may be configured to operate with or be implemented as a cloud-based networking system, a "software as a service" ("SaaS") architecture, or other type of networked computing solution. In one embodiment, price schedule logic 110 is a centralized server-side application that provides at least the functions disclosed herein and that is accessed by many users via computing devices/terminals communicating with the computing system 100 (functioning as the server) over a computer network.

Figure 2A:
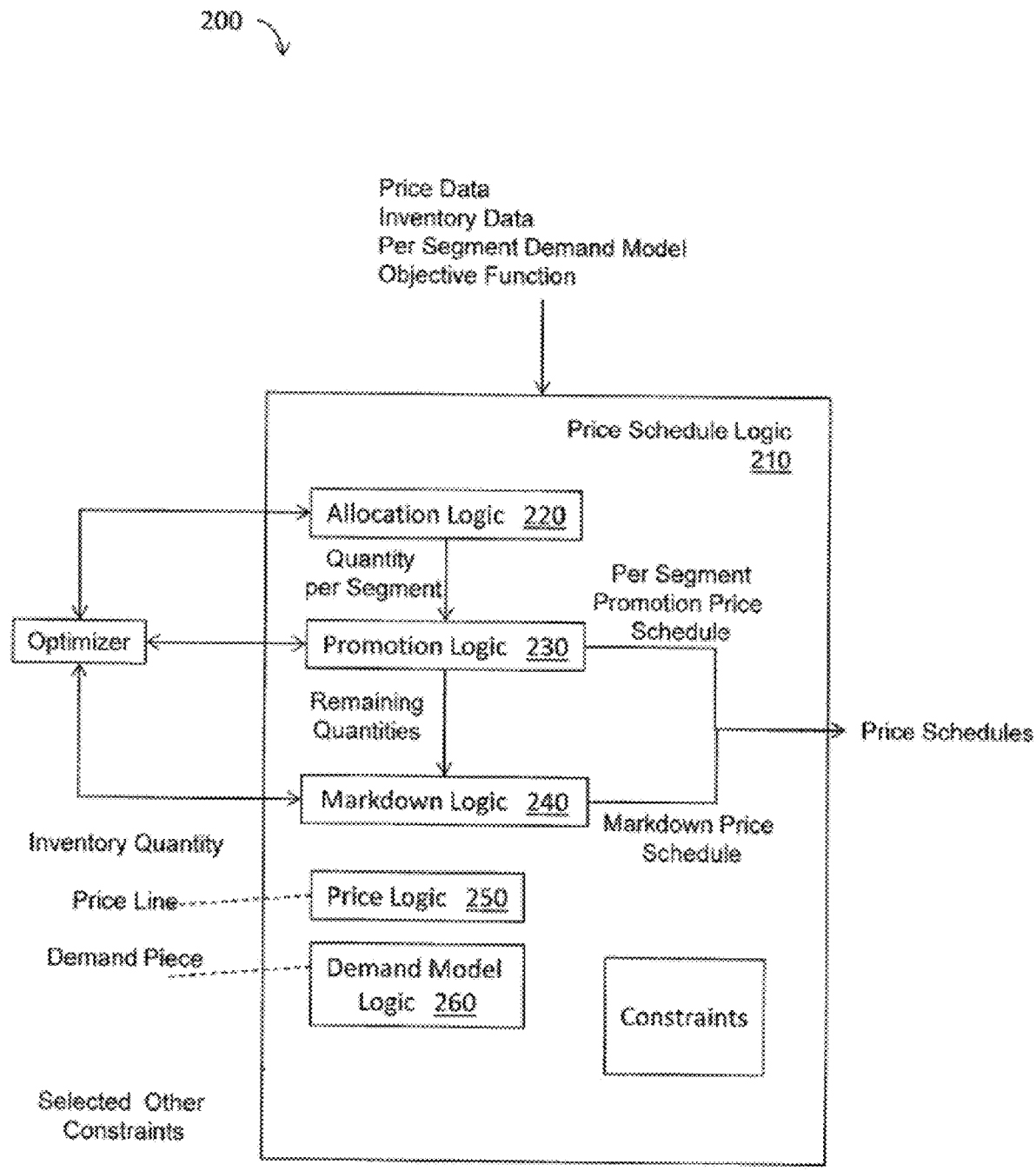
FIG. 2A illustrates a computerized system that generates a price schedule for a set of items in accordance to one embodiment.

FIG. 2A illustrates a computerized system 200 that generates a price schedule for a set of items in accordance to one embodiment. System 200 includes a price schedule logic 210 that includes an allocation logic 220, a promotion logic 230, and a markdown logic 240 that function in a manner analogous to that described for allocation logic 120, promotion logic 130, and markdown logic 140 of FIG. 1. Price logic 210 is configured to interact with an optimizer (e.g., a mixed integer linear programming ("MILP") solver such as "Gurobi" optimization solver) to generate the price schedule. A number of constraints that constrain various aspects of the price schedule according to business rules and other constraints generated by price schedule logic 210 as described below are stored by price schedule logic 210. Mathematical notations describing many example constraints are included in Appendix A. These constraints will be referred to by a constraint number assigned to the constraint in the appendix.

As disclosed, the complexity of generating a price schedule using a per-segment demand model quickly becomes infeasible as the number of items increase. To make a solution using an MILP based optimizer feasible, price schedule logic 210 includes a price logic 250, a demand model logic 260, and an objective function logic 270 that make simplifications to the price data, the per segment demand model, and the objective function, respectively, that are provided to the optimizer in the form of approximation constraints.

Price logic 250 is configured to generate a price line constraint that approximates the set of prices in a manner that allows the prices to be expressed as an integer variable. Demand logic 260 is configured to generate two or more linear demand pieces that approximate the demand function for a customer segment and to provide a selected one of the pieces as a demand piece constraint for each price value.

Allocation logic 220, promotion logic 230, and markdown logic 240 are configured to provide the approximation constraints along with selected other constraints to the optimizer in a manner disclosed in more detail below, after the approximation constraints are disclosed in detail.

Figure 2B:
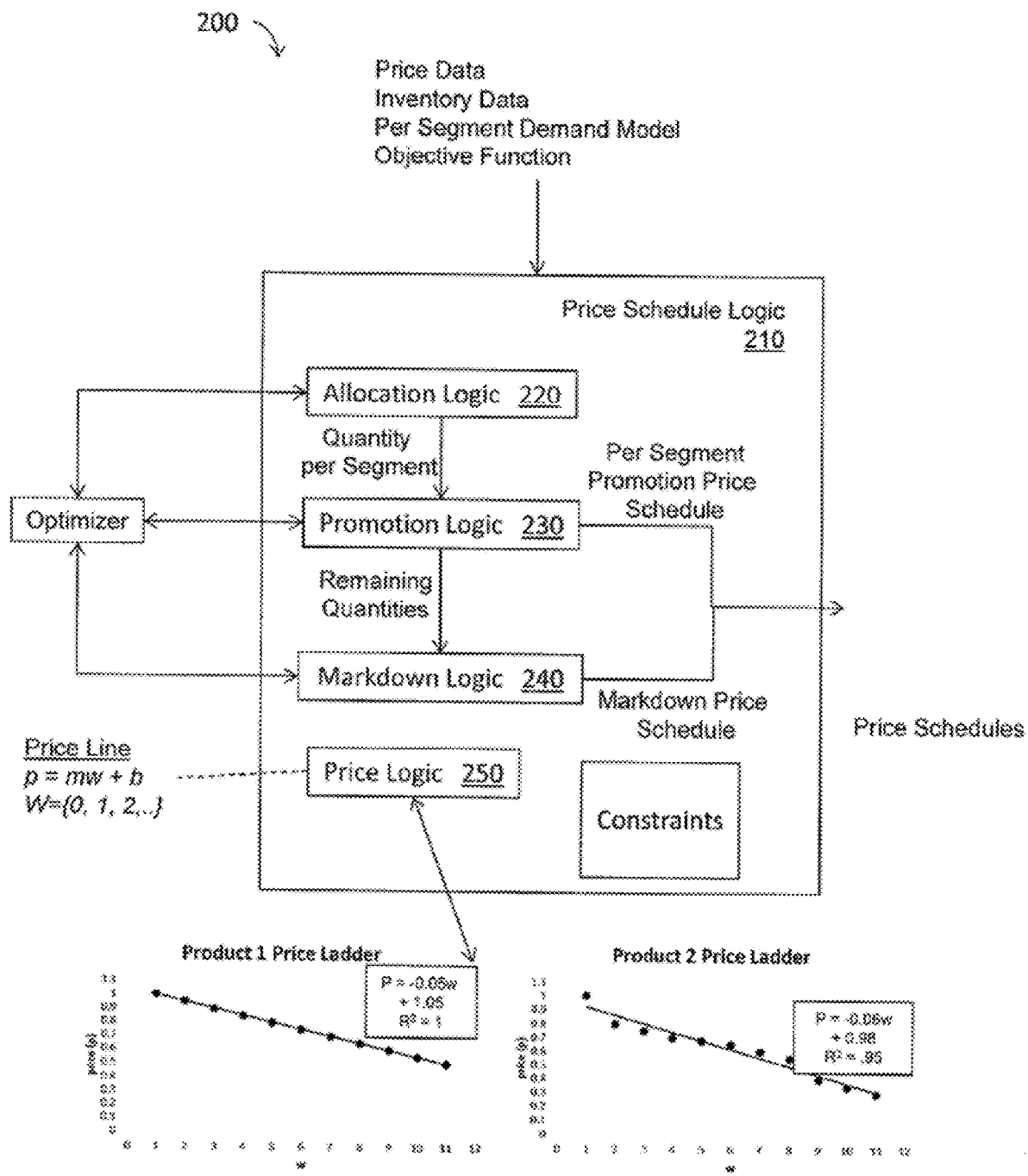
FIG. 2B illustrates how price logic generates the price line constraint that is used to approximate the set of prices for an item in accordance to one embodiment.

FIG. 2B illustrates how price logic 250 generates the price line constraint that is used to approximate the set of prices for an item in accordance to one embodiment. Using the price line constraint recognizes that optimization problems with integer variables over a finite interval are typically simpler to handle than problems that include a "scaled" number of binary variables accounting for the same interval. If the prices in the set or prices or "price ladder" for an item are regularly spaced, the price ladder can be represented by a scaled integer variable. This feature is used to approximate the price ladder by a line given by position variable "w", which is an integer. Prices in the line correspond to different values of w. In general, price ladders are discrete and not necessarily evenly spaced. However, the price line approximation produces acceptable results even when this is the case. Post optimization, a "true" price value from the price ladder that corresponds to the position variable w selected by the optimizer can be included in the price schedule and any other calculations.

To determine the line for a given price ladder, ordinary least squares ("OLS") regression is performed on the prices, where each price, taken in order, is assigned a next value of w as shown in FIG. 2B. The price line constraint, also included as constraint "C1" in the Appendix A can be expressed mathematically as:

$$p_i^{t,seg} = \hat{\alpha}_i^{t,seg} - \hat{\beta}_i^{t,seg} w_i^{t,seg} \text{ where } w_i^{t,seg} = \{0,1,2,3 \ldots L_i\} \quad \text{(equation 1)}.$$

In equation 1, $p_i^{t,seg}$ is the price for item "i" in customer segment "seg" at time "t". To determine $\hat{\alpha}_i^{t,seg}$ and $\hat{\beta}_i^{t,seg}$, the OLS regression is performed for each product, customer segment, and time period during the regular season. During the clearance season, the OLS regression is performed for each product and time period. If the price ladder for an item is the same for all customer segments, and/or all time periods the number of OLS regressions is reduced accordingly. FIG. 2B shows two price ladders for two different products. The prices in the first price ladder are equally spaced and exactly define a line. The equation for that line can be seen to be p=−0.05 w+1.05. Likewise, the equation for the price line for the second price ladder can be seen to be p=−0.06 w+0.98. The price line for the item is provided to the optimizer by allocation logic 120, promotion logic 130, and markdown logic 140.

Figure 2C:
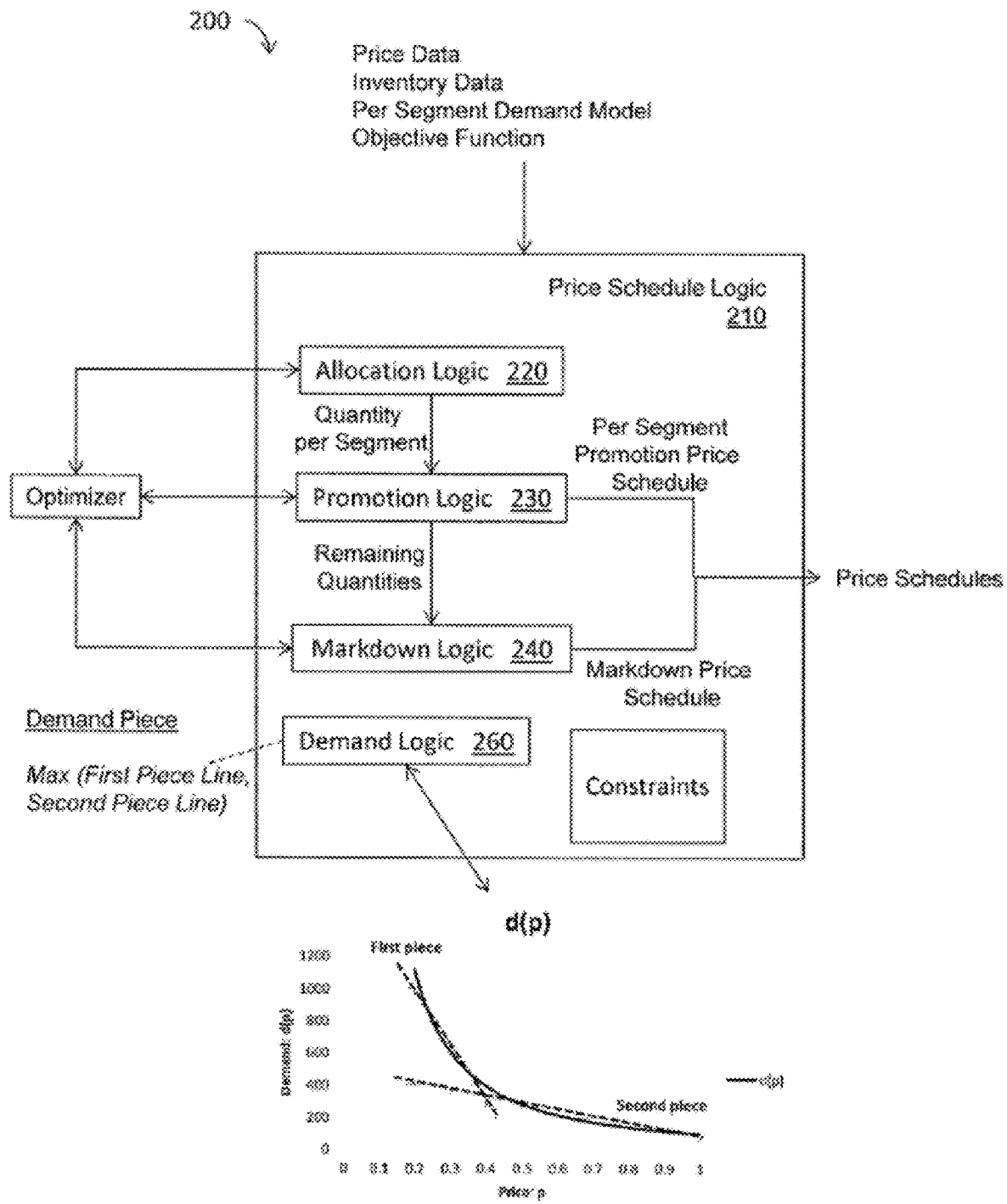
FIG. 2C illustrates how demand logic determines the demand piece constraint that is a linear approximation of the per-segment demand model provided to the optimizer in accordance to one embodiment.

FIG. 2C illustrates how demand logic 260 determines the demand piece constraint that is a linear approximation of the per-segment demand model provided to the optimizer in accordance to one embodiment. In one embodiment, demand logic 260 is configured to approximate the per-segment demand model over two linear pieces. A mathematical expression of one approximate demand model that includes two linear pieces is:

$$d_i^{t,seg}(p_i^{t,seg}) \approx B_i^{t,seg} * SEA_i^{t,seg} * \max(\overline{m}_i^{t,seg} p_i^{t,seg} + \overline{c}_i^{t,seg}, \hat{m}_i^{t,seg} p_i^{t,seg} + \hat{c}_i^{t,seg}) \quad \text{(equation 2)}.$$

In equation 2, $d_i^{t,seg}$ is the demand for item "i" in customer segment "seg" at time "t", $B_i^{t,seg}$ is the base demand for item "i" in customer segment "seg" at time "t", $SEA_i^{t,seg}$ is the base seasonality of item "i" in customer segment "seg" at time "t", $\overline{m}_i^{t,seg}$ and $\hat{m}_i^{t,seg}$ are the slope of the first demand piece and second demand piece, respectively, of item "i" in customer segment "seg" at time "t", and $\overline{c}_i^{t,seg}$ and $\hat{c}_i^{t,seg}$ are the y intercept of the first demand piece and second demand piece, respectively, of item "i" in customer segment "seg" at time "t".

To determine the slope and y intercepts of the first and second demand pieces in the regular season, OLS regression is run on demand values as determined given the different prices in the price ladder for each product, customer segment, and time period in the regular season. The resulting demand pieces are per-segment demand pieces used to generate promotion prices.

During the clearance season, the demand values for the different segments are aggregated in each time period and the OLS regression of the aggregated demand is performed for each product and time period. The resulting demand pieces are aggregate demand pieces used to generate markdown prices.

Mathematically, for any given price point, demand logic 260 selects the demand piece constraint that yields the higher demand. This is why equation 2 includes the "max" function. Constraint C8 describes, mathematically, one embodiment of the demand piece constraint.

In one embodiment, the demand logic 260 is configured to approximate the demand model over more than two pieces. The demand logic 260 is configured to determine an error in fit when two pieces are used and if the error is above a threshold, "break" the demand model at the point of highest error and re-calculate three linear pieces. This process is repeated until the error becomes small enough. The demand model logic 260 then selects the piece that yields the highest demand at each price point as described above.

Referring again to FIG. 2A, the multi-stage process utilized by price schedule logic 210 to generate the price schedule for an item will now be described. Recall that allocation logic 220 allocates the inventory quantity among the customer segments based on a predicted contribution of each customer segment to the objective function (e.g., revenue). Allocation logic 220 uses the optimizer to predict the contributions of each segment as follows. Allocation logic 220 allocates the entire inventory quantity (including initial inventory and any replenishment) to each segment. Allocation logic 220 modifies constraint C7 to constraint C7' and also modifies constraint C8 to constraint C8' (see Appendix A).

Allocation logic 220 adjusts a "markdown price change limit" constraint C4 using segment-wise variables as follows:

$$\forall i \in \mathbb{P}, seg \in \mathbb{S}: \sum_{t=1}^{T_R} x_i^{t,seg} \leq MPROMS_i \text{ and} \quad \text{(equation 3)}$$

$$\forall i \in \mathbb{P}, t \in \mathbb{T}_C: \sum_{i=1}^{N} x_i^{t,seg} \leq MPRODS_t.$$

In equation 3, S is the set of customer segments, $T_R$ is the set of time periods in the regular season, $MPRODS_t$ is the number of products that can be marked down in time period "t", $x_i^{t,seg}$ is one when there is a price change for item "i" in customer segment "seg" at time "1", MPROMS$_i$ is the number of times an item "i" can be marked down during the time periods in the clearance season, and y$_i^{t,seg}$ is the sales of item "i" in customer segment "seg" during time period "t", and $\mathbb{T}_C$ is the set of time periods in the clearance season.

Allocation logic 220 feeds the full inventory quantity allocated to each segment, the modified "inventory conservation" constraint C7', the modified "markdown price change limits" constraint C4, the price line constraint C1, the modified demand piece constraint C8', and the constraints C2, and C3, to the optimizer. Note that, in one embodiment, allocation logic 220 does not include a sell-through constraint C5 in the problem formulation used to allocate the inventory. The sell-through constraint specifies a certain amount of inventory that is to be sold during the entire selling season (e.g., 90%). Dropping this constraint reduces the chance that the optimizer will be unable to solve for an optimal objective function.

The optimizer obtains an optimal objective function Z$_{seg}^*$ for each customer segment based on this full allocation of inventory to the customer segment and transmits the optimal objective function for each customer segment to allocation logic 220. Allocation logic 220 calculates an inventory allocation ratio $r_{seg}$ for each customer segment as follows:

$$r_{seg} = \frac{z^*_{seg}}{\sum_{s' \in \mathbb{S}} z^*_{s'}} \quad \text{(equation 4)}$$

Allocation logic 220 then allocates the inventory quantity (including replenishment, if any) to each customer segment according to its inventory allocation ratio.

Promotion logic 230 is configured to generate the promotion portion of the price schedule. For each customer segment, promotion logic 230 modifies the "inventory conservation" constraint C7 to C7' (as with allocation logic 220) to handle only a single customer segment. Promotion logic 230 modifies the "sell-through" constraint C5 for each segment as follows:

$$\forall i \in \mathbb{P}, t \in \mathbb{T}: I_i^{t,seg} - (d_i^{t,seg} - bo_i^{t,seg} \geq (1-ST_i^t)I_i^{1,seg} \quad \text{(equation 5)}.$$

In equation 5, ST$_i^t$ is the sell-through target for product i at end of time-period t. Note that equation 5 uses the inventory-wise d$_i^{t,seg}$ and bo$_i^{t,seg}$ of constraint C7'.

For each customer segment, promotion logic 230 feeds the inventory quantity allocated to the segment, the modified "inventory conservation" constraint C7', the modified "sell-through" constraint C5, the price line constraint C1, the per-segment demand piece constraint C8', and the constraints C2 and C3, to the optimizer. In one embodiment, additional constraints that reflect business rules (see Constraints section below) are provided to the optimizer. The optimizer obtains an optimal objective function Z$_{seg}$ for each customer segment based on optimal promotion prices p_opt$_i^{t,seg}$ expressed as position variables w$_i^{t,seg}$ for each price in the time periods in the regular season. Promotion logic 230 is configured to select, from the "true" price ladder for the item, the promotion price value p$_i^{t,seg}$ that corresponds to the selected position variable w$_i^{t,seg}$. An example is shown below:

| w$_i^{t,seg}$ (position variable) | p$_i^{t,seg}$ (approx. price ladder) | p_opt$_i^{t,seg}$ (true price ladder) |
|---|---|---|
| 0 | 1.00 | 1.00 |
| 1 | 0.90 | 0.90 |
| 2 | 0.79 | 0.80 |
| 3 | 0.77 | 0.78 |
| 5 | 0.67 | 0.65 |

When the optimizer returns the position variable value of 2, which corresponds to price 0.79 on the price line, the promotion logic selects the "true" price of 0.80 that is associated with the position variable 2. The selected prices for each time period in the regular season make up the promotion portion of the price schedule.

Markdown logic 240 is configured to generate the markdown portion of the price schedule. Markdown logic 240 drops all regular season time periods because the item is being priced for the clearance season.

$$\mathbb{T}_R = \phi; \mathbb{T} = \mathbb{T}_C. \text{ This means that } 1 \leq t \leq T_C \quad \text{(equation 6)}.$$

The markdown logic calculates the aggregated inventory quantity as:

$$I_i^1 = \sum_{seg \in \mathbb{S}} I_i^{TR+1,seg} \quad \text{(equation 7)}.$$

Markdown logic 240 feeds the aggregated inventory quantity, the price line constraint C1, the aggregated demand piece constraint C8, and the constraints C2-C7 to the optimizer. In one embodiment, additional constraints that reflect business rules (see Constraints section below) are provided to the optimizer.

The optimizer obtains an optimal objective function based on optimal markdown prices pm_opt$_i^t$ expressed as position variables w for each price in the clearance season time periods. Markdown logic 240 is configured to select, from the "true" price ladder for the item, the markdown price value that corresponds to the selected position variable as described above. The selected prices for each time period in the clearance season make up the markdown portion of the price schedule. Price schedule logic 210 is configured to combine the promotion portion with the markdown portion to generate the price schedule that is transmitted to the retailer.

Constraints

A user of system 100 may selectively enable and specify several different business related constraints. These constraints will be provided to the optimizer by allocation logic 220, promotion logic 230, and markdown logic 240. Example business related constraints will now be described. Of course, any number of other constraints on possible prices for items may be presented to the optimizer to constrain the optimizer's solution in accordance with a retailer's pricing policies.

A "self no-touch" constraint models the fact that two consecutive promotions of a specific item should be separated by a few time periods (e.g., minimum of two weeks between consecutive promotions). A retailer may choose to enable this constraint for certain (or all) items and, for each item, specify the minimum number of time periods between consecutive promotions. One possible mathematical formulation of the "self no-touch" constraint suitable for input to an MIP solver is presented in mathematical form as constraint C10 in Appendix A.

A "cross no-touch" constraint models the fact that two consecutive promotions of any two different items should be separated by a few time periods (e.g., minimum of two weeks between consecutive promotions for yogurt of any brand). A retailer may choose to enable this constraint for certain (or all) sets of items and, for each set of items, specify the minimum number of time periods between consecutive promotions. One possible mathematical formulation of the "cross no-touch" constraint suitable for input to an MIP solver is presented in mathematical form as constraint C11 in Appendix A.

Set constraints include "must-promote sets of items" and "cannot-promote sets of items." Items in a "must-promote set" must be promoted together. For example, if there are three products of a shampoo brand (e.g., shampoo, conditioner, and hair spray), a retailer may want to put all the three products on promotion at the same time. A retailer may choose to enable the must-promote set constraint for certain sets of items. Items in a "cannot-promote set" cannot be promoted together. For example, a retailer may not want to put a highly popular shampoo product and a low-seller shampoo product on promotion at the same time. A retailer may choose to enable the "cannot-promote set" constraint for certain sets of items. One possible mathematical formulation of the "must-promote set" constraint and the "cannot-promote set" constraint suitable for input to an MIP solver is presented in mathematical form as constraints C12 and C13, respectively, in Appendix A.

Inter-item constraints can be used by a retailer to impose price restrictions that maintain the price order between two items. For example, a retailer may want to specify that the price of a national brand item should always be higher than a private label brand item. Another example would be to maintain the price relation between a 2-pack of 2-liter Coke bottles and a 4-pack of 2-liter Coke bottles. A retailer may choose to enable the inter-item constraints for certain sets of items. The retailer specifies the relationships between prices of items in the set that must be maintained. One possible mathematical formulation of the "cross no-touch" constraint suitable for input to an MIP solver is presented in mathematical form as constraint C14 in Appendix A.

Probability of Return

Inputs

As disclosed, in addition to the above, embodiments account for the probability of return. Therefore, embodiments include the following additional inputs:

Costs $C_{gi}$, which is the cost to the retailer of processing the return of an item i purchased at store g. It is possible for the retailer's customers to purchase at one store and return to another, and if this is a common occurrence at the retailer, the cost $C_{gi}$ should be set to the average cost of processing a return at stores that are most likely to receive a return from a customer who shopped at g. For example, $C_{gi}$ might be set to the average cost of processing a return of item i at stores near g.

Effect of price on return probability $a_{i,g}^{t,seg}$ for item i, week t, segment seg, and store g. These must be greater than 0. These values give the effect of price on return probability. Embodiments do not require that all of these values be unique. For example, these inputs might not vary by week, or by segment. However, embodiments do allow for the possibility that they do. "Segment" refers to the customer segment, meaning a classification of customers into types, performed by the retailer. Through loyalty cards or other mechanisms, a retailer may know that a customer belongs to a particular segment, and thus may be able to adjust the price offered to a customer in the segment through additional discounts or rebates. Because embodiments generate prices that vary for each combination of item and week and segment, the probability of return needs to vary by combination of item and week and segment.

Intrinsic effect on return probability $b_{i,g}^{t,seg}$ for item i, week t, segment seg, and store g. These values give the "fixed effect" on return probability that is inherent in the combination of item i, week t, segments, and store g, that is, the constant effect on probability regardless of pricing. For example, at store g, some items may have an intrinsically higher rate of return for all segments regardless of price, or some customer segments may return the item i more frequently regardless of price, and $b_{itsg}$ would be larger in those cases.

$a_{i,g}^{t}$ and $b_{i,g}^{t}$, which are similar to $a_{i,g}^{t,seg}$ and $a_{i,g}^{t,seg}$, respectively, except that they do not depend on the segment. It is expected that whatever provides these inputs may simply take an average of $a_{i,g}^{t,seg}$ across segments to obtain $a_{i,g}^{t}$, or may provide them in any other way that might be more accurate.

Average time to return $R_{i,g}^{t}$, which is the average number of weeks to return item i purchased at store g to store g if the purchase was at week t.

Logistic Function

In order to minimize notations, the following equations assume only one store. Handling multiple stores is a matter of repeating all of the following over all of the stores, and thus it is enough to explain how it works just for one store. Therefore, for the remainder of the specification, the subscripts will not include the store subscript.

Embodiments makes use of the following logistic function:

$$S_{its}(p) = \frac{e^{a_{its}p+b_{its}}}{1+e^{a_{its}p+b_{its}}} \qquad \text{(equation 8)}$$

where p is price. This function ranges between 0 and 1, and gives the probability of return for price p. Since $a_{its} > 0$, as price p increases, S goes towards 1, and as p decreases, p goes towards 0. Because of its properties of going from 0 to 1, it is commonly used to represent probabilities, and is adapted to giving the probability of return based on price. The logistic function of equation 8 also has an advantage of being able to be linearized, disclosed in more detail below.

The Effect of Return Probability on Pricing

The objective function (as disclosed in Appendix A) is a sum of terms $R_{its}(p_{its})$, meaning the revenue from item i in week t for price $p_{its}$ from segments. Embodiments choose prices $p_{its}$ for each item, in each week, and possibly for each segment, subject to various constraints, to maximize the sum of all terms $R_{its}(p_{its})$. As discussed, this is revenue for just a single store, and can then be repeated over all stores To account for probability of return, embodiments modify an objective function disclosed in U.S. patent application Ser. No. 14/989,932 (the disclosure of which is hereby incorporated by reference) as follows:

$$R_{its}(p_{its}) - S_{its}(p_{its})R_{its}(p_{its}) - S_{its}(p_{its})U_{its}(p_{its})C_i$$

Here, the second term subtracts off a portion of the revenue $R_{its}(p_{its})$, namely a portion equal to the probability of return at price $p_{its}$, since that portion must be returned to customers. The last term reflects the cost the retailer incurs for the units returned. $U_{its}(p_{its})$ is the number of units sold when price is at $p_{its}$, and multiplying by probability of return gives the number of units returned. $C_i$ is the cost of processing a single unit of item i, so that the last term gives the total cost of processing the returns resulting from sales represented by $R_{its}(p_{its})$.

The above changes are all related to incorporating the probability of return in the objective function. However, returns also increase the amount of inventory available for sale, and thus the mechanism disclosed in U.S. patent application Ser. No. 14/989,932 which tracks inventory requires modification. Modifications are reflected in C7 and C7' in Appendix A. These modifications assume that if a return occurs, the customer returns the item to the same store from which it was originally purchased. Because embodiments treat each store independently, it is not possible to handle the case where returns go back to a store different from which the purchase was made.

Constraints C7 and C7' incorporate a "back order" notion that replaces the McCormick approximation technique disclosed in U.S. patent application Ser. No. 14/989,932. The variables $bo_i^t$ allow demand $d_i^t$ to exceed inventory at time t, so that pricing solutions where inventory sells out before the end of the time horizon are feasible solutions and can therefore be considered by the optimizer. The demand dl might not be 0 at any price, and without the back order mechanism the optimizer could only consider solutions where inventory never becomes 0 throughout the selling horizon. In the C7 and C7' constraints, the back-order variables make up the difference between demand and remaining inventory, and so the back-order variables are only non-zero when demand exceeds inventory.

In the time periods where demand exceeds inventory, the revenue portion of the objective function given above should contribute less revenue than price multiplied by demand, since a portion of the demand is not fulfilled. However, the objective function simply adds in the full revenue even in these time periods, and thus it could be possible for the optimizer to produce a pricing solution which maximizes revenue by selling non-existent inventory. The penalty λ prevents this from happening, because if λ is large enough, the optimizer will minimize the use of back order even if it leads to larger revenue, and it will only use back order when it is necessary to produce a feasible solution. For example, number of time periods with non-zero back order will be minimum, which is to say the optimizer will use as many periods as possible to sell the inventory, just as the optimal pricing solution should do.

Linearization

Embodiments modify all terms $R_{its}(p_{its})$ of the objective function disclosed in U.S. patent application Ser. No. 14/989,932 as above, but use the linearization of $S_{its}(p_{its})$. Linearization is used in embodiments because it is not possible to directly use $S_{its}(p_{its})$, using a commercially-available Gurobi solver. Therefore the objective function has restrictions on its form. Specifically, $S_{its}(p)$ should be approximated by a linear function of price p for restricted values of p, and this approximation can then be used in place of $S_{its}(p)$. The approximation in embodiments is:

$$S_i^{t,seg}(p)=0.18(a_i^{t,seg}p+b_i^{t,seg})+0.5$$

for p in the range $$\frac{-2.77-b_i^{t,seg}}{a_i^{t,seg}} \leq p \leq \frac{2.77-b_i^{t,seg}}{a_i^{t,seg}}$$

The derivation for the approximation and the range and the justification that it is a good approximation is described below. The range and approximation given above capture most of the variation of the logistic function, namely the portion where it is transitioning from 0 to 1. Outside of this range the logistic function is very close to either 0 or 1.

The approximation can also be disclosed as:

$$S_i^t(p)=0.18(a_i^t p+b_i^t)+0.5$$

for p in the range $$\frac{-2.77-b_i^t}{a_i^t} \leq p \leq \frac{2.77-b_i^t}{a_i^t}$$

This is the same approximation, just labeled without segments and using the non-segment-specific $a_i^t$ and $b_i^t$.

Figure 3A:
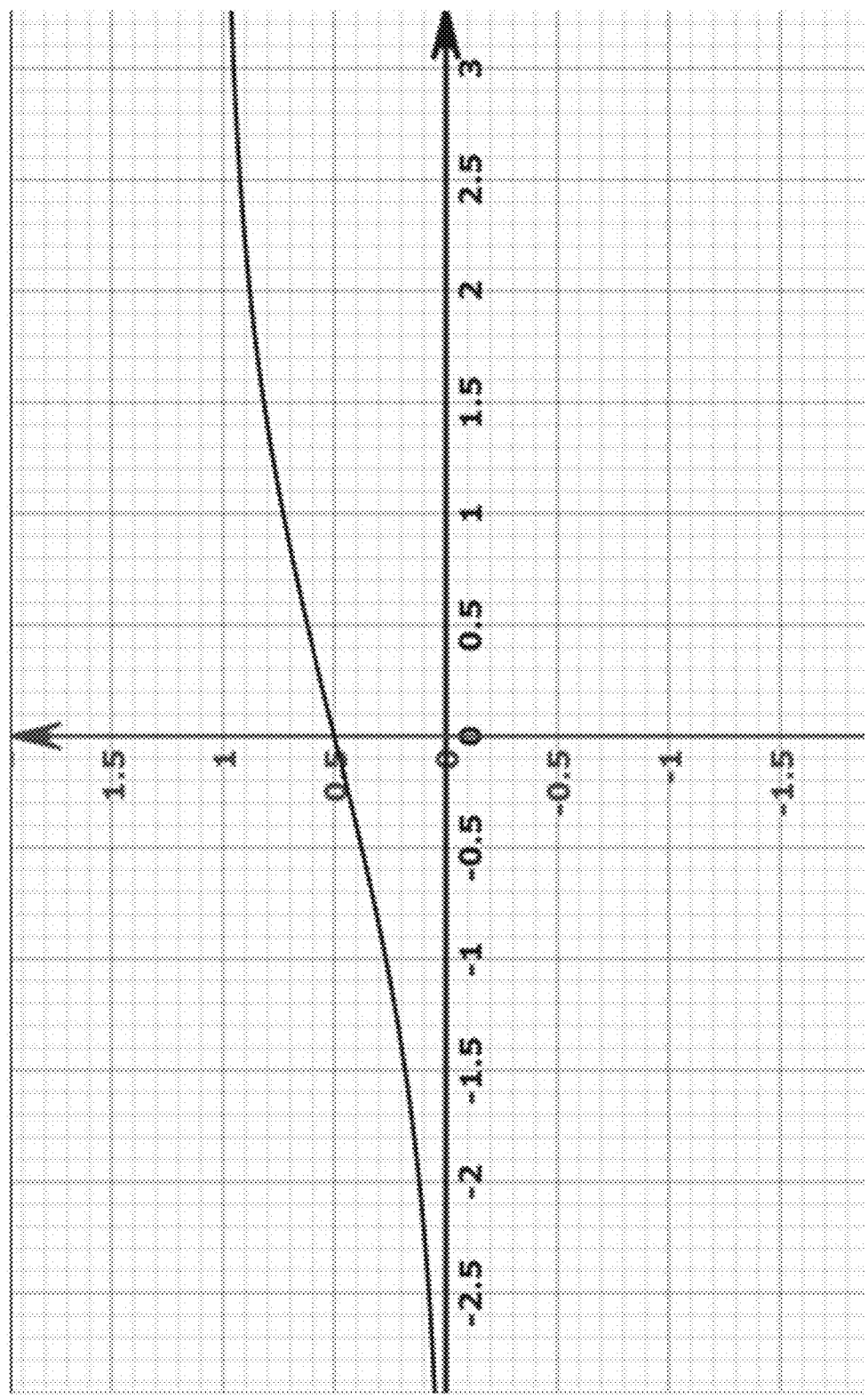
FIG. 3A graphically illustrates the logistic function in accordance to embodiments.

FIG. 3A graphically illustrates the logistic function in accordance to embodiments. FIG. 3A illustrates the graph of the logistic function $$S(x) = \frac{e^x}{1+e^x}$$

showing that most of the change in the logistic function occurs between −3 and 3. Below −3, the probability is very close to 0, and above 3, the probability is very close to 1. In fact, $S(-3) \approx 0.047$, and $S(3)=1-S(-3) \approx 0.953$.

Therefore, embodiments can approximate the function $S(x)$ between −3 and 3 with a linear function of the form $y=mx+0.5$, $m>0$. Embodiments find a value for m to make the linear function as close to $S(x)$ as possible in the range [−3,3]. To measure closeness, embodiments choose a standard such measure, called the $L_2$ norm. Thus, embodiments find the m which minimizes:

$$\int_{-3}^{3}(mx+0.5-S(x))^2 dx$$

In fact, using symmetry of both the logistic function and $y=mx+0.5$, it is necessary only to minimize the integral from 0 to 3 instead of −3 to 3.

To solve for m, the integral is calculated by expanding the square:

$$(mx+0.5-S(x))^2=m^2x^2+mx-2mxS(x)+C$$

where C represents several terms which involve only x and not m. Such terms, after integrating, will simply be constants, and thus do not affect calculating the best m, and so can simply be left out. This leaves integrating just the following:

$$\int_0^3 (m^2x^2+mx-2mxS(x))dx = \frac{m^2}{3}x^3\Big]_0^3 + \frac{m}{2}x^2\Big]_0^3 - 2m\int_0^3 xS(x)dx =$$

$$9m^2 + \frac{9}{2}m - 2 \cdot 3.87 m$$

Here is it necessary to numerically integrate $$\int_0^3 xS(x)dx \approx 3.87$$

Embodiments now find the m which minimizes the $L_2$ integral. The expression for above is quadratic in m, and thus differentiating with respect to m and finding where the resulting expression is 0 will find the minimum:

$$18m - 3.24 = 0$$

$$m = \frac{3.24}{18} \approx 0.18$$

This is the 0.18 which appears in the section above on linearization of the logistic function.

Embodiments then check on where the approximation becomes 0 and where it becomes 1, since it is possible that the approximation hits 0 for x slightly larger than −3 and hits 1 for x slightly smaller than 3. In fact, the approximation hits 0 at x≈−2.77 and hits 1 at x≈2.77, so the range of the approximation is [−2.77, 2.77], and this is the range used in embodiments.

Embodiments numerically integrate the value of the original $L_2$ norm with 0.18 plugged in for m, to check that the value is appropriately small:

$$\int_{-2.77}^{2.77} (0.18x + 0.5 - S(x))^2 dx \approx 0.00743$$

Figure 3B:
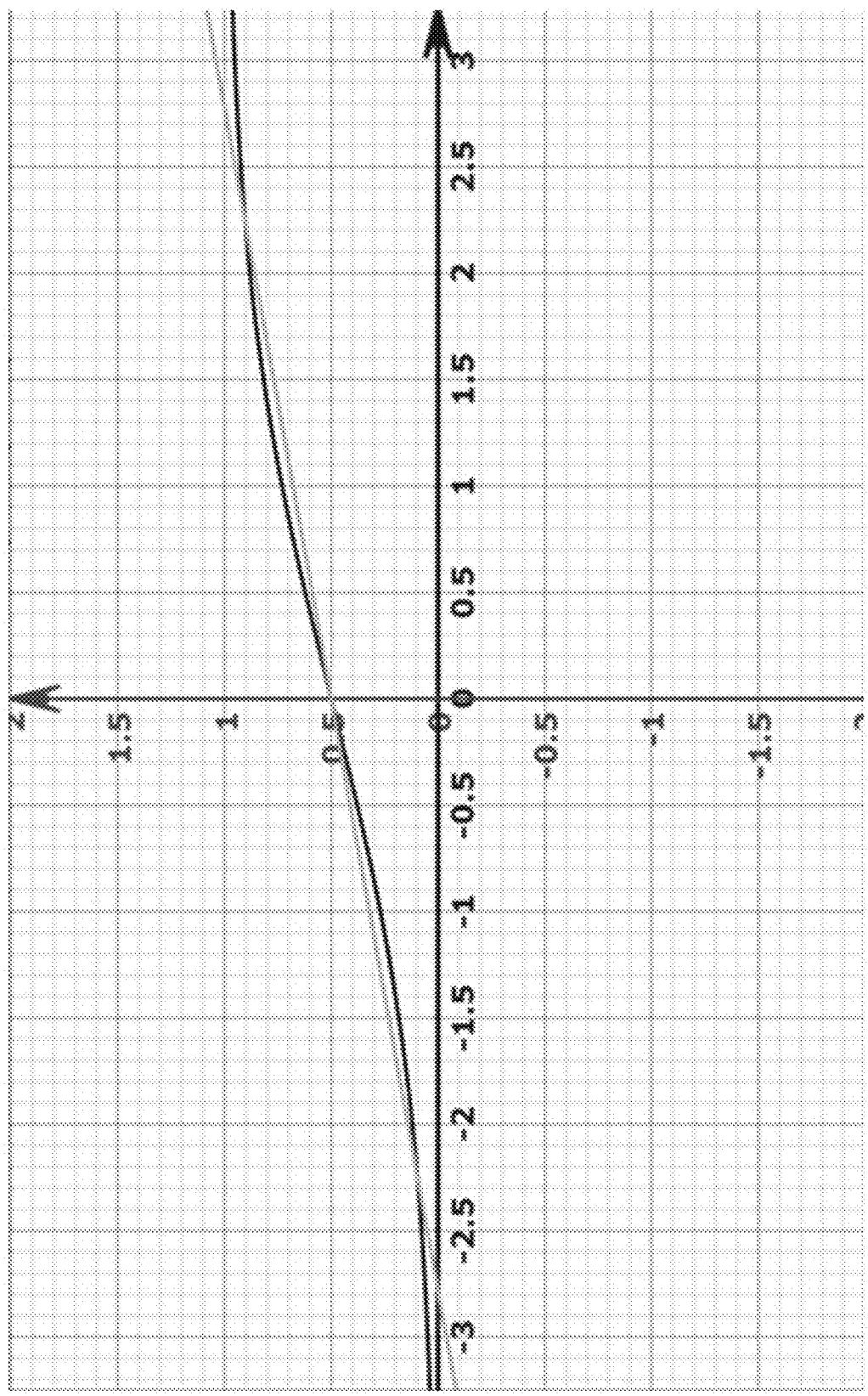
FIG. 3B graphically illustrates the logistic function with its approximation in accordance to embodiments.

FIG. 3B graphically illustrates the logistic function with its approximation in accordance to embodiments.

Solving the Objective Function that Incorporates Approximation

In U.S. patent application Ser. No. 14/989,932, the expressions for $R_{its}(p_{its})$ and for $U_{its}(p_{its})$ are both linear in the price $p_{its}$, and thus after using the approximation given above for $S_{its}(p_{its})$, the terms $S_{its}(p_{its})R_{its}(p_{its})$ and $S_{its}(p_{its})U_{its}(p_{its})C_i$ are both quadratic in $p_{its}$. This is an allowed form of objective function for the Gurobi solver. However, though this is an allowed form of objective function for the Gurobi solver, to avoid nonsensical values from the objective function, embodiments place additional restrictions on prices.

Specifically, the approximation embodiments are using for $S_{its}(p_{its})$ is only valid within the range given above, and thus $p_{its}$ should be restricted to this range. Going outside this range means the approximation for $S_{its}(p_{its})$ will return a number less than 0 or greater than 1, which is nonsensical as a probability. Thus, the range constraints given above for the approximation are included. However, embodiments do not simply blindly impose these restrictions on every $p_{its}$, and in fact a pre-processing step, discussed below, is used to impose the restrictions.

A number of constraints on the prices, reflecting typical business rules concerning pricing at retailers are disclosed above. One of the constraints is a "price ladder" constraint, which already places its own range constraint on the prices and in fact it specifies a finite set of prices for the item i at store s. Only some of these prices may fall into the range imposed by the logistic approximation, and it is possible that few prices in fact do. Therefore, embodiments incorporate the following pre-processing functionality:

1. If fewer than 80% of the prices in the price ladder for item i at s fall into the range imposed by the logistic approximation, then embodiments do not consider return probability for this item at this store. Specifically, the portion of the objective function for item i at store s is NOT modified as disclosed above.

2. However, consider only the upper bound of the logistic-approximation range, $$\frac{2.77 - b_{its}}{a_{its}}.$$

Suppose at least 80% of prices in the price ladder are below this value (that is, consider the number of prices in the price ladder if the lower bound of the logistic approximation range are ignored). In this circumstances, while embodiments still do not modify the objective function, the additional constraint $$p_{its} \leq \frac{2.77 - b_{its}}{a_{its}}$$

is $a_{its}$ added.

If too few prices fall into the range of the logistic approximation, then many prices must give a return probability of close to 0 or close to 1, and thus there is not much point in using pricing to affect return probability, except to eliminate those prices that give a return probability close to 1. These prices are the ones which are at or above the upper bound $$\frac{2.77 - b_{its}}{a_{its}}$$

of the logistic approximation, which is the reason for pre-processing step 2 above. Still, if eliminating these prices removes too many prices from the price ladder, then embodiments forgo even the addition of this constraint.

Generation of Probability of Return Related Inputs

As disclosed above, various new inputs are used in comparison with the inputs disclosed in U.S. patent application Ser. No. 14/989,932. Specifically, inputs $a_{i,g}^{t,seg}$, $b_{i,g}^{t,seg}$, $a_{i,g}^{t}$, $b_{i,g}^{t}$, and $R_{i,g}^{t}$ are needed and can be generated from any source in various embodiments. However in one embodiment these inputs are generated as follows.

Logistic Regression

As disclosed above, the a and b inputs are used in the logistic function to produce a probability of return for item i purchased in week t at store g for price p by a customer belonging to segment seg:

$$S_{i,g}^{t,seg}(p) = \frac{e^{a_{i,g}^{t,seg} p + b_{i,g}^{t,seg}}}{1 + e^{a_{i,g}^{t,seg} p + b_{i,g}^{t,seg}}}$$

Finding values for $a_{i,g}^{t,seg}$ and $b_{i,g}^{t,seg}$ from historical data involves logistic regression, meaning finding the values of $a_{i,g}^{t,seg}$ and $b_{i,g}^{t,seg}$ which make the logistic function fit the data the best. The use of logistic regression is a known technique, and available in most statistical packages and statistical languages such as R, or from statistical libraries available for programming languages such as Java or Python. Using logistic regression in any of these forms requires specifying a statistical model and historical data.

Historical Data for Running Logistic Regression

A "transaction" includes the items a customer purchased on a single trip through the check-out. The historical data for the regression includes the following customer-identified transactions:

The date of the transaction;
The basket of items a customer purchased;
The store where the transaction occurred; and
An identifier for the customer, so that it can be known when the same customer again makes a transactions (otherwise the data cannot show if the customer returned an item). The identifier can be a loyalty card number issued by the retailer, but it can also be any other kind of unique identifier for the customer, such as a credit card number. Industry practice in retail includes using scrambled credit card numbers to link together transactions, and thus loyalty cards, while useful, may not be a necessity to link together transactions from the same customer.

The historical data includes a large number of such transactions for a single retailer, as much data as the retailer has stored. In embodiments, such data is stored in a table in a relational database, where each transaction is stored as a set of multiple rows, one row for each item purchased in the transaction. The table contains columns for each of the above four pieces of data, so each row has a column identifying the item purchased, and then four columns for the above for a total of five columns.

Features for the Regression

In embodiments, the regression does not run directly on the table described above, but rather columns are added to the table that become the inputs to the regression. Such additional columns based on the historical data are the "features" fed into the regression. For each row in the above table, values are generated for the features described below. Each feature is listed along with its column name for ease of reference. Thus, these columns are added to the table of historical data, and the columns are populated as described below. The dataset that is fed into logistic regression then includes the following features:

1. Features derived from the store in a row. For each row, add the following features:
   a. Average household income of the store's zip code (AVG_HH_INC).
   b. GINI index of the store's zip code (GINI). This is a readily-available economic index, representing the amount of variation in wealth within the zip code.
   c. Population of the store's zip code (POP_NUM).
   d. Whether the store is brick-and-mortar or represents an on-line sale (E_DUMMY). This feature is simply 1 or 0 depending on whether the "store" is on-line (1) or a real store (0).
2. Features derived from the customer in a row.
   a. Historical return probability of the customer up to the date of the transaction (RET_PROB_WITH_PRIOR). Suppose D is the date of the transaction. Calculate this feature by: divide the number of items the customer returned in history before D by the total number of items the customer bought in history before D. In other words, it is the propensity of the customer to return an item, based on the history of the customer up to the date of the transaction D.
3. Features derived from the date of the transaction
   a. Month indicator (FISCAL_MO). This is a categorical variable in the regression (meaning a variable which takes discrete values). It indicates the month of the transaction.
   b. Holiday/major promotion indicator (HOLIDAY_DUMMY). This feature is either 0 or 1, and indicates whether the date of the transaction is near to a major holiday or promotion. The set of holidays and promotions is configurable per retailer, and should include those days where the retailer's sales are especially large due to the day being near a major holiday or store-wide promotion. Such days will differ from retailer to retailer, and thus this needs to be configured per retailer, by examining historical data to find the days when the retailer's sales are especially high.
4. Features derived from the item in a row. As disclosed above, each row represents one purchased item (as part of a transaction), and these features are derived from that item.
   a. Actual price (SALE_PRICE_FRACTION). This is the actual price the customer received in this row, expressed as a fraction of full price. For example, 0.8 would mean the customer bought the item at a 20% discount from full price. For this feature, the regression creates separate coefficients for each customer segment, to capture variation of the coefficients by customer segment. (This is "actual price interacted with segment", in standard statistical language.)
   b. Item's full price (FULL_PRICE). The non-discounted price of the item at the store in this row.
   c. Number of items with the same Class purchased in the same transaction (SAME_GROUP_COUNT). The items for sale at a retailer are organized into a hierarchy, the "merchandise hierarchy." The Class level of the hierarchy might denote a collection of similar items, such as "all men's dress pants," and transactions where the customer purchased more than one item from the same class might indicate that the customer intends to return some of them later. Which level of the hierarchy represents the class level is a configuration, dependent on the retailer.
   d. Number of days since the item first went on sale (DAYS_FROM_FIRST). For the item in this row, this is the number of days between the day of the first sale of the item and the transaction date.
   e. Color popularity within the Class (COLOR_POP). This is a value between 0 and 1, and indicates the fraction of sold items up to the transaction date which had the same color as the item in this row within the same Class at the store in this row.
   f. Size popularity within the Class (SIZE_POP). Similar to COLOR_POP, except it indicates the popularity of the size of the item in this row at the store in this row.
5. Feature indicating the item was returned (ITEM_RETURNED). This column is either 0 or 1, indicating whether the item in the row was eventually returned (within the historical data available). The column is calculated by scanning forward in the available historical data, to find whether there is a return transaction for this customer for this item.

Data Filtering for the Logistic Regression

A standard part of running any regression is to remove nonsensical data from the data set to be fed into the regression. Thus, before running the regression on the above data, embodiments remove rows where any of the following hold:

1. SALE_PRICE_FRACTION is not between 0 and 100. Such a condition indicates an error in the pricing data that was stored for the sale of the item.
2. The customer ID is not present, or represents a "fake customer." Some retailers have "default" customer IDs, associated to transactions where the customer did not have a loyalty card or other identifying information. Identifying the default IDs is a matter of finding those customer IDs which have far too many transactions associated with them (for example, thousands). Any transactions with such IDs should be removed from the data set.

3. The row is a return with no accompanying purchase. That is, the row is a return of merchandise but is not paired up during construction of the ITEM_RETURNED feature with a corresponding purchase. Note that this removes only the row representing such a return, not the entire transaction containing that row, since the rest of the rows in the transaction may be perfectly valid data.
4. The money amount returned to the customer in a return in greater than the amount the customer originally paid for the item. In this case, remove both the row giving the sale of the item as well as the row representing its return. Again, this situation indicates a data error of some kind occurred, and the associated data is untrustworthy.

Running the Logistic Regression

The logistic regression runs on the rows which remain after performing the above row filtering. The dependent variable of the regression is the ITEM_RETURNED feature, and all other features are independent variables.

The regression gives a coefficient for each feature. It is now a matter of using those coefficients to produce the $a_{i,g}^{t,seg}$, $a_{i,g}^{t,seg}$, $a_{i,g}^{t}$, $b_{i,g}^{t}$ inputs.

Other Inputs

Running the logistic regression requires only the above described historical data and features constructed from historical data in embodiments. However, producing the $a_{i,g}^{t,seg}$, $b_{i,g}^{t,seg}$, $a_{i,g}^{t}$, $b_{i,g}^{t}$ inputs from the results of the regression needs the following additional inputs from the retailer in embodiments:

For each item i that the retailer will apply the optimization to, the date $F_{i,g}$ when i will first be sold in store g.

Classification of historical customers into segments.

The full price of each item (this was already used in the regression for the feature FULL_PRICE) at each store.

Using the Regression Coefficients to Produce the Inputs

The table below shows how to calculate $a_{i,g}^{t,seg}$, $b_{i,g}^{t,seg}$, $a_{i,g}^{t}$, and $b_{i,g}^{t}$ Each row produces a number, and the numbers from each row should be summed up to produce the value for $a_{i,g}^{t,seg}$ or $b_{i,g}^{t,seg}$.

| Input name | Values to sum up | Explanation of notation for the value |
| --- | --- | --- |
| $a_{i,g}^{t,seg}$, for $t \geq F_{i,g}$ (if $t < F_{i,g}$ then the item hasn't started selling yet) | AVG_HH_INC(g) | Get the value of the feature for store g and multiply it by the regression coefficient of the feature |
| | GINI(g) | Get the value of the feature for store g and multiply it by the regression coefficient of the feature |
| | POP_NUM(g) | Get the value of the feature for store g and multiply it by the regression coefficient of the feature |
| | E_DUMMY(g) | Get the value of the feature for store g and multiply it by the regression coefficient of the feature |
| | RET_PROB_WITH_PRIOR(seg) | For each customer in seg, calculate RET_PROB_WITH_PRIOR of the customer using all of historical data. Then take the weighted average of all those values, weighted by the total number of items each customer bought in history. |
| | FISCAL_MO(t) | Find the fiscal month of week t, and get the corresponding regression coefficient for the month. |
| | HOLIDAY_DUMMY(t) | Multiply HOLIDAY_DUMMY(t) by the regression coefficient for HOLIDAY_DUMMY. |
| | SAME_GROUP_COUNT(i,g,seg) | Take the average of SAME_GROUP_COUNT over all transactions containing item i from any customer in seg at the store g. Multiply this average by the regression coefficient for SAME_GROUP_COUNT. |
| | DAYS_FROM_FIRST(i,g,t) | Calculate the number of days between t and $F_{i,g}$ and multiply the regression coefficient for DAYS_FROM_FIRST |
| | COLOR_POP(i,g) | Find the overall popularity of the color of item i within all historical data of store g within the class of i: divide the total number of units sold at g which have the color of i by the total number of units sold at g. Multiply this overall popularity by the regression coefficient for COLOR_POP. |
| | SIZE_POP(i, g) | Same calculation as for COLOR_POP(i,g) except with the size of i instead of color. |
| | FULL_PRICE(i,g) | Multiply the FULL_PRICE of item i at store g by the regression coefficient for FULL_PRICE. |
| $b_{i,g}^{t,seg}$ for $t \geq F_{i,g}$ | SALE_PRICE_FRACTION(i,g,seg) | Take the coefficient for SALE_PRICE_FRACTION for seg, divide by the full price for item i at g. |

| Input name | Values to sum up | Explanation of notation for the value |
| --- | --- | --- |
| $a_{i,g}^t$ for $t \geq F_{i,g}$ | RET_PROB_WITH_PRIOR | For each customer (regardless of segment), calculate RET_PROB_WITH_PRIOR of the customer using all of historical data. Then take the weighted average of all those values, weighted by the total number of items each customer bought in history. |
| | SAME_GROUP_COUNT(i,g) | Take the average of SAME_GROUP_COUNT over all transactions containing item i from any customer (regardless of segment) at the store g. Multiply this average by the regression coefficient for SAME_GROUP_COUNT. |
| | All of the other summands above from $a_{i,g}^{t,seg}$ other than the RET_PROB_WITH_PRIOR and SAME_GROUP_COUNT | Copy all of the other summands from $a_{i,g}^{t,seg}$ other than the RET_PROB_WITH_PRIOR and SAME_GROUP_COUNT, because the other ones do not rely on segment and thus can be used directly |
| $b_{i,g}^t$ for $t \geq F_{i,g}$ | SALE_PRICE_FRACTION(i,g,seg) | Average together the regression coefficients for SALE_PRICE_FRACTION (recall there is coefficient for each segment), and then divide by the full price for item i at g. |

The Time-to-Return $R_{i,g}^t$

The algorithm for calculating $R_{i,g}^t$ is a "hierarchical algorithm," meaning it calculates $R_{i,g}^t$ at all levels of the merchandise hierarchy is as follows:

1. At the lowest level, the calculation is relatively simple: calculate the average time to return of i purchased at store g during fiscal week t, where the average is taken over the transactions containing i where i was subsequently returned (in fact embodiments can simply use the data described above that was fed into the logistic regression to perform this calculation).

2. Now process the rest of the merchandise hierarchy in the same fashion. For node N of the merchandise hierarchy, calculate the average time to return of any item in N purchased at store g during fiscal week t, where the average is taken over the transactions containing any item in N and where the item was subsequently returned.

3. Now for each lowest-level $R_{i,g}^t$ in step 1, find the $R_{i,g}^t$ which have no value (because for example item i was never purchased at store g in fiscal week t). For each such lowest level $R_{i,g}^t$, from item i go up the merchandise hierarchy to find the first node where Step 2 successfully calculated an average. Take this average as $R_{i,g}^t$. (This process is called "escalation").

The Problem of "New Items"

At many clothing retailers, for example, each selling season involves selling a large number of new items, meaning items that have not sold before in history and are newly created for the current selling season. In this case, to obtain values of at $a_{i,g}^{t,seg}$, $b_{i,g}^{t,seg}$, $a_{i,g}^t$, $b_{i,g}^t$, and $R_{i,g}^t$ for such items, it is necessary to make some assumptions about the new items. The following example is where the new item goes into a known class, and the approach here is to construct $a_{i,g}^{t,seg}$, $b_{i,g}^{t,seg}$, $a_{i,g}^t$, $b_{i,g}^t$, and $R_{i,g}^t$ by taking averages over the new item's class. In the following table, suppose C is the class of new-item i.

| Input name | Values to sum up | Explanation of notation for the value |
| --- | --- | --- |
| $a_{i,g}^{t,seg}$, for $t \geq F_{i,g}$ (if $t < F_{i,g}$ then the item hasn't started selling yet). The rows list the values which are based on the item i. The other rows do not use the item and so remain the same even if the item is new. | SAME_GROUP_COUNT(C,g,seg) | Take the average of SAME_GROUP_COUNT over all transactions containing any item from C from any customer in seg at the store g. Multiply this average by the regression coefficient for SAME_GROUP_COUNT. |
| | DAYS_FROM_FIRST(i,g,t) | This can use the same calculation in the case when i is not a new item, because $F_{i,g}$ will be known by the retailer even if i is new. |
| | COLOR_POP(i,g) | This can use the same calculation as when i is not a new item, because the retailer will know the color of the new item. |
| | SIZE_POP(i,g) | This can use the same calculation as when i is not a new item, because the retailer will know the size of the new item. |
| | FULL_PRICE(i,g) | This can use the same calculation as when i is not a new item, because the retailer will know the full price of the new item. |

-continued

| Input name | Values to sum up | Explanation of notation for the value |
|---|---|---|
| $b_{i,g}^{t,seg}$ for $t \geq F_{i,g}$ | SALE_PRICE_FRACTION(i,g,seg) | This can use the same calculation as when i is not a new item, because the retailer will know the full price of the new item. |
| $a_{i,g}^{t}$ for $t \geq F_{i,g}$ | SAME_GROUP_COUNT(C,g) | Take the average of SAME_GROUP_COUNT over all transactions containing any item from C from any customer (regardless of segment) at the store g. Multiply this average by the regression coefficient for SAME_GROUP_COUNT. |
|  | All of the other summands above from $a_{i,g}^{t}$ other than the SAME_GROUP_COUNT | Copy all of the other summands from $a_{i,g}^{t}$ SAME_GROUP_COUNT, because the other ones do not need modification to account for C. |
| $b_{i,g}^{t}$ for $t \geq F_{i,g}$ | SALE_PRICE_FRACTION(i,g,seg) | This can use the same calculation as when i is not a new item, because the retailer will know the full price of the new item. |
| $R_{i,g}^{t}$ |  | Use escalation, as described in Step 3 of the calculation for $R_{i,g}^{t}$. |

Figure 4:
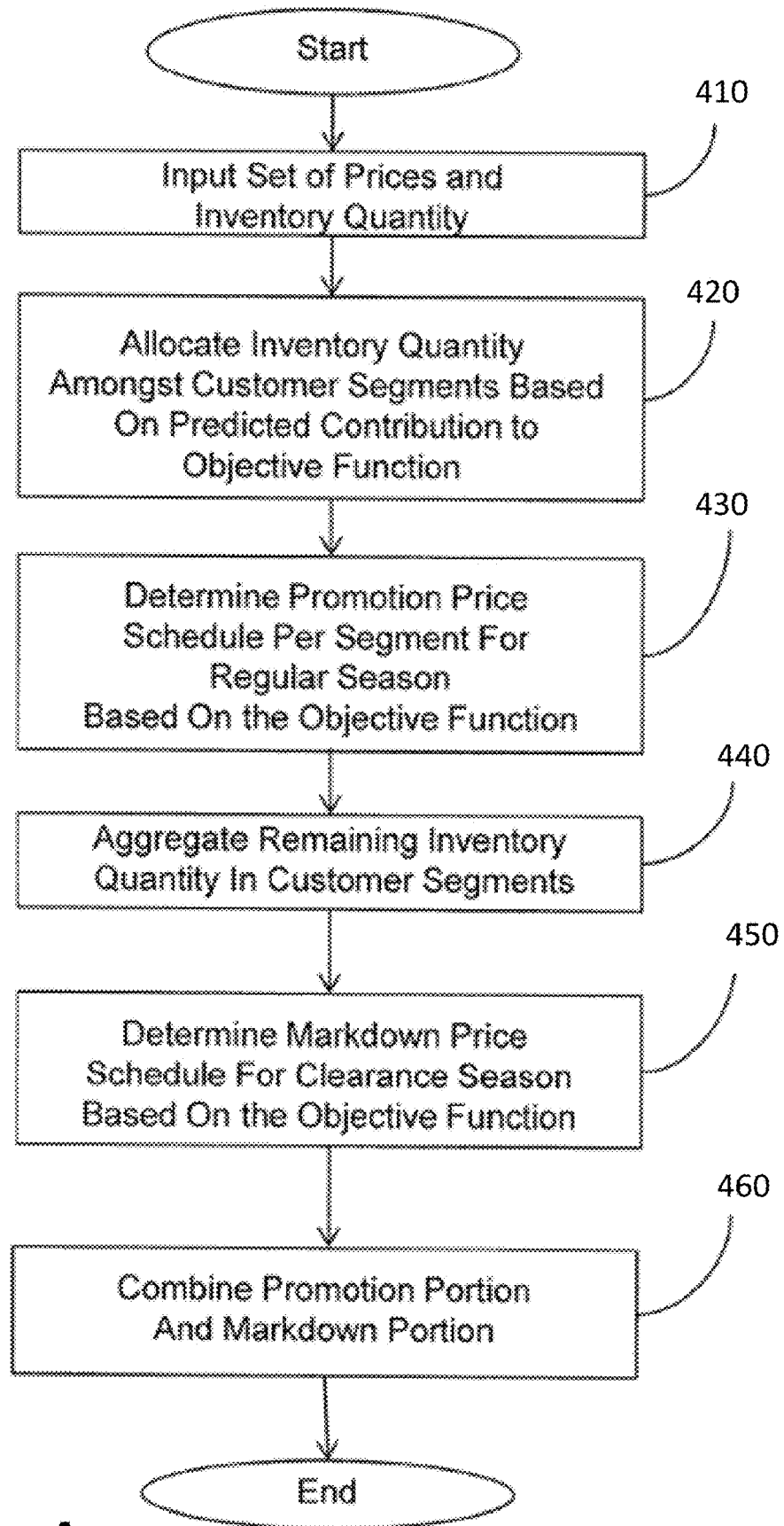
FIG. 4 is a flow diagram of the functionality of price schedule logic of FIG. 1 when determining a promotion and markdown price schedule for each item of a group of items that accounts for the probability of return of each item in accordance with one embodiment.

FIG. 4 is a flow diagram of the functionality of price schedule logic of FIG. 1 when determining a promotion and markdown price schedule for each item of a group of items that accounts for the probability of return of each item in accordance with one embodiment. In one embodiment, the functionality of the flow diagram of FIG. 4 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 410, a set of prices for the item, an inventory quantity for the item, a per-segment demand model for the item, and an objective function that is a function of the per-segment demand model are received or input. This step may be performed by the price schedule logic 110 or 210 of FIGS. 1 and 2A-2C. In one embodiment, the data corresponding to the set of prices is stored in records in a database table or other database structure that can be queried by price schedule logic 110. In one embodiment, data describing the set of prices and inventory quantity are stored in registers or memory addresses, the contents of which may be read, input, or transferred into the working memory of price schedule logic 110. In one embodiment, data structures encoding the per-segment demand model and a selected objective function are received by way of an electronic communication from a retailer that is parsed to identify the data structures. The objective function, as disclosed in detail above, is a quadratic objective function that maximizes revenue while by accounting for the probability of return of each item and the cost of such returns.

At 420, the inventory quantity is allocated among a plurality of customer segments based at least on a predicted contribution of each customer segment to the objective function. 420 may be performed by allocation logic 120 or 220 of FIGS. 1 and 2A-2C. A processor is controlled by allocation logic 110 or 220 to allocate the inventory quantity.

For each customer segment, based at least on a quantity of inventory allocated to the customer segment, a promotion portion of the price schedule that maximizes the objective function is determined at 430. The promotion portion assigns to the item a series of prices selected from the set of prices for respective time periods during a regular season for the item. 430 may be performed by promotion logic 240 of FIGS. 1 and 2A-2C. A processor is controlled by the promotion logic 240 to create the promotion portion of the price schedule.

At 440 a quantity of remaining inventory allocated to the plurality of customer segments at an end of the regular season is aggregated. 440 may be performed by markdown logic 250 of FIGS. 1 and 2A-2C. A processor is controlled by markdown logic 250 to aggregate the remaining inventory.

At 450, based at least on the aggregated inventory, a markdown portion of the price schedule for the item that maximizes the objective function is determined. The markdown portion assigns a series of prices selected from the set of prices for respective time periods during a clearance season for the item. 450 may be performed by markdown logic 250 of FIGS. 1 and 2A-2C. A processor is controlled by markdown logic 250 to create the markdown portion of the price schedule.

The promotion portion and the markdown portion are combined to create a price schedule for the item at 460. 460 may be performed by price schedule logic 110 or 210 of FIGS. 1 and 2A-2C. A processor is controlled by price schedule logic 110 or 210 to combine the promotion portion and the markdown portion.

In one embodiment, an electronic communication that includes the price schedule is transmitted, by way of a network or internet connection, to a computing device of the retailer. In one embodiment, the price schedule causes the computing device of the retailer to modify/adjust prices of items in data records of an inventory/pricing database according to the price schedule. The modified/adjusted prices provide a pricing solution to improve the selected objective function in a manner that observes the selected constraints.

In one embodiment, the functionality of FIG. 4 includes allocating the inventory quantity among customer segments by performing the following for each customer segment: allocating an entirety of the inventory quantity to the customer segment; transmitting the entirety of the inventory quantity, the set of prices, an approximate per-segment demand model, a first set of constraints, and an approximate objective function to an optimizer; receiving, from the optimizer, a per segment value of the approximate objective function for the customer segment; computing a ratio of the per segment value to a sum of all per segment values for the customer segments; and allocating the inventory among the customer segments according to the ratio for each customer segment.

In one embodiment, the functionality of FIG. 4 includes determining the promotion portion for each customer segment by performing the following: providing the set of prices, the inventory quantity allocated to the customer segment, the approximate per-segment demand model, a second set of constraints, and the approximate objective function to the optimizer; and receiving, from the optimizer, a promotion portion for each customer segment that optimizes the objective function.

In one embodiment, the functionality of FIG. 4 includes determining the markdown portion by performing the following: providing the set of prices, the aggregated inventory, an approximate aggregate demand model for the item, a third set of constraints, and the approximate objective function to the optimizer; and receiving, from the optimizer, a markdown portion that optimizes the objective function.

In one embodiment, the functionality of FIG. 4 includes calculating a line corresponding to a linear approximation of the set of prices, where the line is a function of a position variable that evenly divides the line into segments between a maximum price and a minimum price, where each integer value of the position variable is associated with a price in the set of prices. An equation of the line is provided to the optimizer as the set of prices for the item; an integer value the position variable that corresponds to a selected price is received from the optimizer; a price in the set of prices is identified that corresponds to the position variable; and the identified price is included in the price schedule for the item.

In one embodiment, the functionality of FIG. 4 includes determining the promotion portion for each customer segment by, for each time period, performing the following: calculating a set of customer segment demands for the item when the item is priced at respective prices in the set of prices; calculating a plurality of lines corresponding to a piecewise linear approximation of the set of customer segment demands; and for each price, selecting a line that corresponds to a highest demand at the price. An equation for the selected line is provided to the optimizer as the approximate per-segment demand model for the price during the time period.

In one embodiment, the functionality of FIG. 4 includes determining the markdown portion for the item by, for each time period, performing the following: for each customer segment, calculating a set of customer segment demands for the item when the item is priced at respective prices in the set of prices; calculating a set of respective aggregate demands by aggregating respective customer segment demands for each price; calculating a plurality of lines corresponding to a piecewise linear approximation of the set of aggregate demands; and for each price, select a line that corresponds to a highest demand at the price. An equation for the selected line is provided to the optimizer as the approximate aggregate demand model for the price during the time period.

In one embodiment, the functionality of FIG. 4 includes determining the approximate objective function by, for each time period, performing the following: based on at least on the approximate demand model for the time period, and calculating sales for the item at prices in the set of prices.

Figure 5:
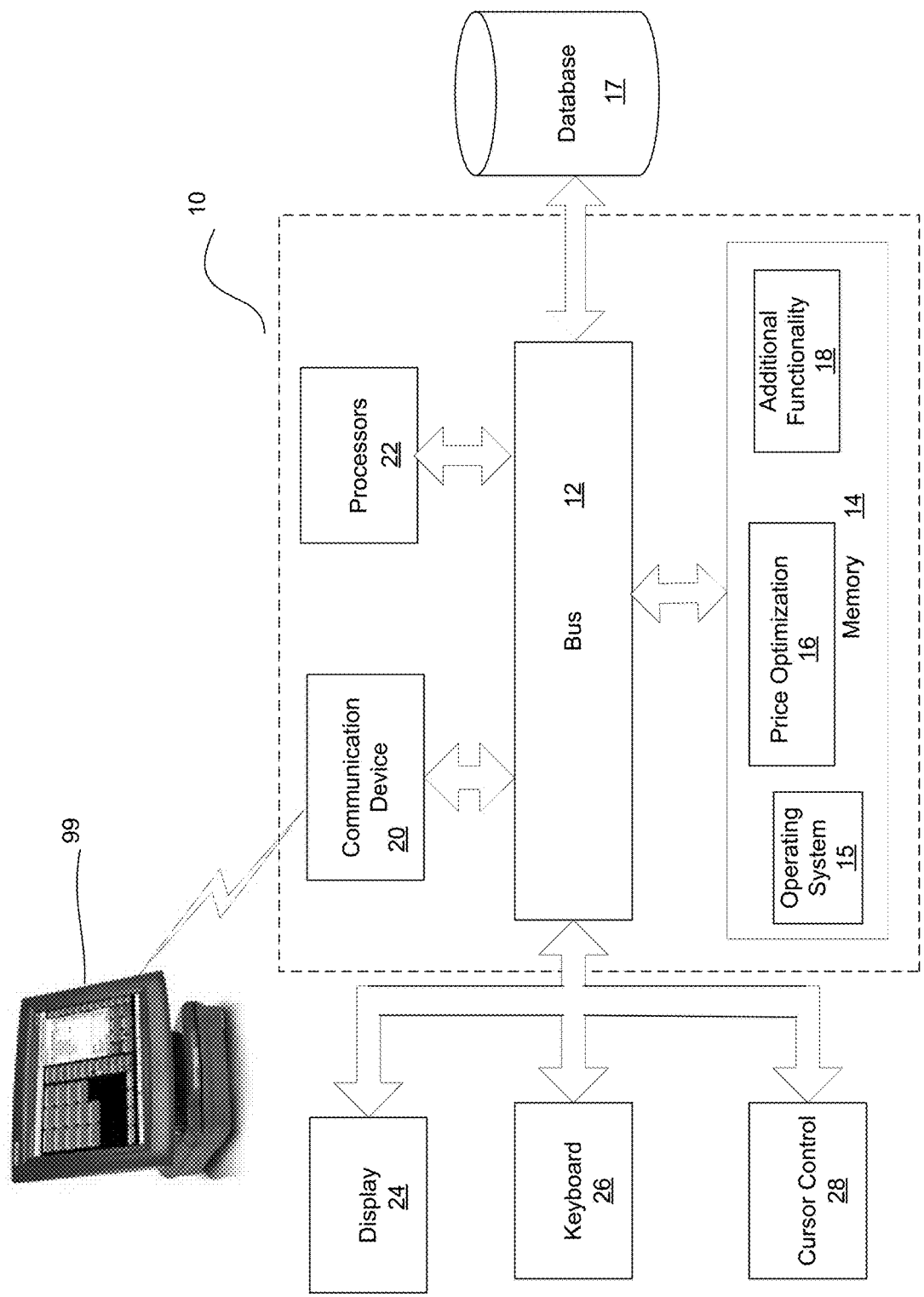
FIG. 5 is a block diagram of a computer server/system in accordance with an embodiment of the present invention.

FIG. 5 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a server, system 10 may need to include a processor and memory, but may not include one or more of the other components shown in FIG. 5, such as a keyboard or display. FIG. 5 can be used to implement any of the components disclosed herein.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a price optimization module 16 that determines optimized pricing for items, include promotion and markdown price scheduling, and all other functionality disclosed herein. System 10 can be part of a larger system. Therefore, system 10 can include one or more additional functional modules 18 to include the additional functionality, such as a retail management system (e.g., the "Oracle Retail Demand Forecasting System" or the "Oracle Retail Advanced Science Engine" ("ORASE") from Oracle Corp.) or an enterprise resource planning ("ERP") system. A database 17 is coupled to bus 12 to provide centralized storage for modules 16 and 18 and store customer data, product data, transactional data, etc. In one embodiment, database 17 is a relational database management system ("RDBMS") that can use Structured Query Language ("SQL") to manage the stored data. In one embodiment, a specialized point of sale ("POS") terminal 99 generates the transactional data and historical sales data (e.g., data concerning transactions of each item/SKU at each retail store) used to forecast demand. POS terminal 99 itself can include additional processing functionality to forecast demand in accordance with one embodiment and can operate as a specialized demand forecasting system either by itself or in conjunction with other components of FIG. 5.

In one embodiment, particularly when there are a large number of retail stores, a large number of items, and a large amount of historical data, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

It can be seen from the foregoing description that the systems and methods described herein include a single layer of approximations to produce a mixed integer linear programming problem of the same dimension. Stock-outs, which impose additional non-smoothness to sales models, are taken into account by the described techniques. Multiple promotion price schedules targeting multiple different customer segments, each with different pricing preferences, are produced by the described techniques. The described framework computes the promotion portion of the price schedule for different customer segments in a manner that makes it possible to utilize mixed integer problem ("MIP") solver-based parallelization. The described techniques can be applied to any demand model regardless of whether the model is non-linear or non-convex. Further, many different business constraints can be included in the solution process.

For simplicity sake in this description the terms objective function, approximate objective function, coefficient, variable, constraint, demand model, approximate demand model, and value have been used. It is to be understood that these terms are to be interpreted as meaning data or data structures that encode the objective function, approximate objective function, coefficient, variable, constraint, demand model, approximate demand model, or value in a manner interpretable by the computing elements described above. Inputting, outputting, receiving, transmitting, or other manipulation of these terms is to be interpreted as storing data in a storage medium, reading data from a storage medium, transmitting or receiving data by way of a network connection, acting on the data with a processor, as appropriate. Further, the term retailer should be interpreted as a computing device or devices under control of a retailer i) seeking a promotion and markdown portion or ii) pricing items according to the price schedule produced by the systems and methods described herein.

As disclosed, embodiments perform price optimization by setting prices that maximize revenue and profit but also accounts for the probability of return of an item as well as the effect on a potential return on inventory. By including these factors, a more accurate optimized price schedule can be determined.

Several embodiments are specifically illustrated and/or described herein. However, it will be appreciated that modifications and variations of the disclosed embodiments are covered by the above teachings and within the purview of the appended claims without departing from the spirit and intended scope of the invention.

APPENDIX A

Notation

| Set/Symbol | Size | Indices | Description |
|---|---|---|---|
| $\mathbb{P}$ | N | i | Set (number) of products |
| $\mathbb{S}$ | S | seg | Set (number) of customer segments |
| $\mathbb{T}$ | T | t | Set (number) of time periods for entire season (e.g., 1 . . . T) |
| $\mathbb{T}_R$ | $T_R$ | t | Set (number) of time periods for regular season |
| $\mathbb{T}_C$ | $T_C$ | t | Set (number) of time periods for clearance season |
| $SUP_i^t$ | | | Replenishments for product i at beginning of time period t |
| $I_i^t$ | | | Initial inventory of an item i at the start of the season |
| $P_i^{full}$ | | | Full or regular price of product i (e.g., $45.99) |
| $C_i$ | | | Cost of product i |
| $P_i^{fullnorm}$ | | | Normalized regular/full price of product i (usually equals 1) |
| $C_i^{norm}$ | | | Normalized cost of product i (equals $C_i/P_i^{full}$) |
| $\mathbb{L}_i^p$ | $L_i^p$ | | Promotion Price ladder for product i (e.g., 1, 0.95, 0.90, . . .) |
| $\mathbb{L}_i^m$ | $L_i^m$ | | Markdown Price ladder for product i |
| $\mathbb{L}_i^{pp}$ | $L_i^{pp}$ | | Planned Promotion Price ladder for product i |
| $ST_i^t$ | | | Sell-through target for product i at end of time-period t |
| $PPROMS_i$ | | | Number of times a product i can be promoted in $T_R$ periods |
| $PPRODS_t$ | | | Number of products that can be promoted in time-period t |
| $MPROMS_i$ | | | Number of times a product i can be marked down in $T_C$ periods |
| $MPRODS_t$ | | | Number of products that can be marked down in time-period t |

Demand Parameters

| Demand Parameter | Definition |
|---|---|
| $\gamma M_i^{t,seg}$ | Markdown price elasticity of an item i for segment seg at time t |

-continued

| Demand Parameter | Definition |
|---|---|
| $\gamma P_i^{t,seg}$ | Promotion price elasticity of an item i for segment seg at time t |
| $\gamma PP_i^{t,seg}$ | Planned promotion price elasticity of an item i for segment seg at time t |
| $PF_i^{t,seg}$ | Promo fatigue of price elasticity for an item i for segment seg at time t |
| $SEA_i^{t,seg}$ | Seasonality of an item i at time t for segment seg |
| $B_i^{t,seg}$ | Base demand (level) of an item i at time t for segment seg |
| $RP_i^{seg}$ | Return percentage of an item i for segment seg |
| $RL_i^{seg}$ | Return lead time of an item i for segment seg |

Decision Variables

| Decision variables | |
|---|---|
| $p_i^{t,seg}$ | Promotion Price of an item i in customer segment seg at time t ($t \in \mathbb{T}_R$) |
| $pm_i^t$ | Markdown price of an item i at time t ($t \in \mathbb{T}_C$) |
| $I_i^t$ | Inventory of an item i at beginning of time-period t ($I_i^1$ = initial inventory of an item i) |
| $\theta_i^{t,seg}$ | Revenue or Profit of an item i in customer segment seg at time t ($t \in \mathbb{T}$) |
| Auxiliary decision variables | |
| $x_i^{t,seg}$ | Equals 1 when there is a price change for product i in customer segment seg at time t |
| $u_i^{t,seg}$ | Equals 1 when there is a price change for product i in customer segment seg at time t when compared to time period t-1 |
| $v_i^{t,seg}$ | Equals 1 when there is a price change for product i in customer segment seg at time t when compared to regular price in time period t |
| $y_i^{t,seg}$ | Sales of product i in customer segment seg at time t |
| $d_i^{t,seg}$ | Demand for product i in customer segment seg at time t |
| $w_i^{t,seg}$ | Index denoting which point in ladder is picked |
| $\kappa_i^{t,seg}$ | Equals 1 when there is a price change for product i in customer segment seg at time t |
| $\delta_i^t$ | Equals 1 when there is a price change for product i in customer segment seg at time t |
| $I_i^{t,seg}$ | Inventory of an item i at beginning of time-period t for customer segment seg ($I_i^{1,seg}$ = initial inventory of an item i for segment seg) |
| $sup_i^{t,seg}$ | Replenishment of an item i at beginning of time-period t for customer segment seg |
| $bd_i^{t,seg}$ | Binary variable equals 1 when the first line is chosen for the demand approximation; 0 for choosing second line |
| $\hat{p}_{i,1}^{t,seg} \hat{p}_{i,2}^{t,seg}$ | Promotion Price of an item i in customer segment seg at time t ($t \in \mathbb{T}_R$), for approximation piece 1 and 2, respectively. |
| $\widehat{pm}_{i,1}^t, \widehat{pm}_{i,2}^t$ | Markdown price of an item i at time t ($t \in \mathbb{T}_C$), for approximation piece 1 and 2, respectively. |
| Output variables | |
| $p\_opt_i^{t,seg}$ | Optimal promotion price of an item i in customer segment seg at time t ($t \in \mathbb{T}_R$) |
| $pm\_opt_i^t$ | Optimal markdown price of an item i at time t ($t \in \mathbb{T}_C$) |
| $I\_opt_i^t$ | Optimal inventory of an item i at beginning of time-period t |
| $y\_opt_i^{t,seg}$ | Optimal sales of product i in customer segment seg at time t |

** Please note that superscript seg is dropped when dealing with clearance periods

CONSTRAINTS

| | |
|---|---|
| Objective function | Quadratic objective function |
| Maximize Revenue | $\max \sum_{i=1}^{N} \sum_{t=1}^{T_R} \sum_{seg=1}^{S} \sum_{l=1}^{2} P_i^{full} \hat{p}_{i,l}^{t,seg} (m_{i,l}^{t,seg} \hat{p}_{i,l}^{t,seg} + c_{i,l}^{t,seg}) +$ $\sum_{i=1}^{N} \sum_{t=T_R+1}^{T} \sum_{l=1}^{2} P_i^{full} \widehat{pm}_{i,l}^t (m_{i,l}^t \widehat{pm}_{i,l}^t + c_{i,l}^t) - \left( \lambda \sum_{t=T_R+1}^{T_R+T_C} \sum_i (bo_i^t)^2 \right)$ |
| Objective function addition: subtract off the cost of returns | Let $Sit_i^{t,seg}$ and $S_i^t$ be the approximations defined in the section on linearization of the logistic function. Add the following to the above maximize revenue objective function: $-\sum_{i=1}^{N} \sum_{t=1}^{T_R} \sum_{seg=1}^{S} \sum_{l=1}^{2} C_i S_i^{t,seg}(\hat{p}_{i,l}^{t,seg})(m_{i,l}^{t,seg} \hat{p}_{i,l}^{t,seg} + c_{i,l}^{t,seg}) -$ $\sum_{i=1}^{N} \sum_{t=T_R+1}^{T} \sum_{l=1}^{2} C_i S_i^t(\widehat{pm}_{i,l}^t)(m_{i,l}^t \widehat{pm}_{i,l}^t + c_{i,l}^t)$ |
| Objective function addition: subtract off the returned revenue | Let $Sit_i^{t,seg}$ and $S_i^t$ be the approximations defined in the section on linearization of the logistic function. Add the following to the above maximize revenue objective function: $-\sum_{i=1}^{N} \sum_{t=1}^{T_R} \sum_{seg=1}^{S} \sum_{l=1}^{2} S_i^{t,seg}(\hat{p}_{i,l}^{t,seg})(\theta_{i,l}^{t,seg} \hat{p}_{i,l}^{t,seg} + \delta_{i,l}^{t,seg}) -$ $\sum_{i=1}^{N} \sum_{t=T_R+1}^{T} \sum_{l=1}^{2} S_i^t(\widehat{pm}_{i,l}^t)(\theta_{i,l}^t \widehat{pm}_{i,l}^t + \delta_{i,l}^t)$ |

| C#: Name (prefix) | Inequalities |
|---|---|
| C1: price ladder (pricelad) | $\forall i \in \mathbb{P}, t \in \mathbb{T}_R, seg \in \mathbb{S}: p_i^{t,seg} = \hat{\alpha}_i^{t,seg} - \hat{\beta}_i^{t,seg} w_i^{t,seg}$ $\forall i \in \mathbb{P}, t \in \mathbb{T}_C: pm_i^t = \hat{\alpha}_i^t - \hat{\beta}_i^t w_i^t$ |
| C2: Price Change Identification | $\forall i \in \mathbb{P}, t \in \mathbb{T}_R, seg \in \mathbb{S}: p_i^{fullnorm} - p_i^{t,seg} \geq \dfrac{v_i^{t,seg}}{M_1}$ $\forall i \in \mathbb{P}, t \in \mathbb{T}_R, seg \in \mathbb{S}: p_i^{fullnorm} - p_i^{t,seg} \leq v_i^{t,seg} M_1$ |
| (pricechid) | $\forall i \in \mathbb{P}, t \in \mathbb{T}_R, seg \in \mathbb{S}: p_i^{t-1,seg} - p_i^{t,seg} + \dfrac{u_i^{t,seg}}{M_1} \leq \kappa_i^{t,seg} M_1$ $\forall i \in \mathbb{P}, t \in \mathbb{T}_R, seg \in \mathbb{S}: p_i^{t,seg} - p_i^{t-1,seg} + \dfrac{u_i^{t,seg}}{M_1} \leq (1 - \kappa_i^{t,seg}) M_1$ |

| C#: Name (prefix) | Inequalities |
|---|---|
| | $\forall i \in \mathbb{P}, t \in \mathbb{T}_R, seg \in \mathbb{S}: x_i^{t,seg} \leq u_i^{t,seg}$ |
| | $\forall i \in \mathbb{P}, t \in \mathbb{T}_R, seg \in \mathbb{S}: x_i^{t,seg} \leq v_i^{t,seg}$ |
| | $\forall i \in \mathbb{P}, t \in \mathbb{T}_R, seg \in \mathbb{S}: 1 + x_i^{t,seg} \geq u_i^{t,seg} + v_i^{t,seg}$ |
| | $\forall i \in \mathbb{P}, t \in \mathbb{T}_C$: Repeat above by dropping superscript seg and using $pm_i^t$ |
| | Add the markdown count constraints |
| | $\forall i \in \mathbb{P}, t \in \mathbb{T}_R, seg \in \mathbb{S}\, x_i^{t,seg} \leq u_i^{t,seg}$<br>$\forall i \in \mathbb{P}, t \in \mathbb{T}_R, seg \in \mathbb{S}\, x_i^{t,seg} \leq v_i^{t,seg}$<br>$\forall i \in \mathbb{P}, t \in \mathbb{T}_R, seg \in \mathbb{S}\, 1 + x_i^{t,seg} \geq u_i^{t,seg} + v_i^{t,seg}$<br>$\forall i \in \mathbb{P}, t \in \mathbb{T}_R$: Repeat above by dropping superscript seg and using $pm_i^t$ Add the markdown count constraints |
| C3: Promo Price Change Limits (ppricechlt) | $\forall i \in \mathbb{P}, t \in \mathbb{T}_R, seg \in \mathbb{S}: \sum_{t=1}^{T_R} x_i^{t,seg} \leq \text{PPROMS}_i$<br><br>$\forall i \in \mathbb{P}, t \in \mathbb{T}_R, seg \in \mathbb{S}: \sum_{t=1}^{N} x_i^{t,seg} \leq \text{PPRODS}_t$ |
| C4: | $\forall i \in \mathbb{P}: \sum_{t \in \mathbb{T}_C} x_i^t \leq \text{MPROMS}_i$ |
| Markdown Price Change Limits (mpricechlt) | $\forall i \in \mathbb{P}, \in \mathbb{T}_C: \sum_{t=1}^{N} x_i^t \leq \text{MPRODS}_t$ |
| C5: Sell-through (sellthru) | $\forall i \in \mathbb{P}, t \in \mathbb{T}: I_i^t - (d_i^t - bo_i^t) \leq (1 - ST_i^t) I_i^1$ |
| C7: Sales Calculation (revised to track inventory changes produced by returns). | For $t \in \mathbb{T}_R$:<br><br>$d_i^t = \sum_{seg} d_i^{t,seg}$<br><br>(Note that $d_i^t$ already has a constraint in C8 for $t \in \mathbb{T}_C$, so the above constraint defines $d_i^t$ for all the other t, which is to say for $t \in \mathbb{T}_R$.)<br>For all t:<br>$I_i^{t-1} + R(t) = I_i^t + d_i^t - bo_i^t$<br>$d_i^t - bo_i^t \geq I_i^{t-1} + R(t) - (1 - \eta_i^t) M$<br>$d_i^t - (I_i^{t-1} + R(t)) \leq \eta_i^t M$<br>$d_i^t - (I_i^{t-1} + R(t)) \geq (1 - \eta_i^t) M$<br>$bo_i^t \leq \eta_i^t M$<br>R(t) is defined as:<br>If $t \in \mathbb{T}_R$, then<br><br>$R(t) = \sum_{seg} \sum_{t'} \sum_{l=1}^{2} \phi_{i,l}^{t',seg} \tilde{p}_{i,l}^{t',seg} + \psi_{i,l}^{t',seg}$<br><br>If $t \in \mathbb{T}_C$, then<br><br>$R(t) = \sum_{t'} \sum_{l=1}^{2} \phi_{i,l}^{t'} \widetilde{pm}_{i,l}^{t'} + \psi_{i,l}^{t'}$<br><br>Here the sum over t' is for all t' where<br>$t' + R_i^{t'} = t$<br>That is, those weeks t' where purchases in that week would end up being returned in week t). Thus, the sum in the large parentheses represents the items returned in week t from purchases in weeks earlier than t.<br>Here, $\eta_i^t$ is a binary decision variable which is 1 if backorder is being used, and 0 if back order is not being used. |

| C#: Name (prefix) | Inequalities |
|---|---|
| | For all t:<br>$I_i^{t-1,seg} + R(t) = I_i^{t-1,seg} + d_i^{t,seg} - bo_i^{t,seg}$<br>$d_i^{t,seg} - bo_i^{t,seg} \geq I_i^{t-1,seg} + R(t) - (1 - \eta_i^{t,seg})M$<br>$d_i^{t,seg} - (I_i^{t-1,seg} + R(t)) \leq \eta_i^{t,seg}M$ |
| C7': C7 for Allocation logic | $d_i^{t,seg} - (I_i^{t-1,seg} + R(t)) \geq -(1 - \eta_i^{t,seg})M$<br>$bo_i^{t,seg} \leq \eta_i^{t,seg}M$<br>R(t) is defined as:<br>$$\sum_{t'} \sum_{l=1}^{2} \phi_{i,l}^{t',seg} \hat{p}_{i,l}^{t',seg} + \psi_{i,l}^{t',seg}$$<br>Here the sum over t' is for all t' where<br>$t' + R_i^{t'} = t$<br>That is, those weeks t' where purchases in that week would end up being returned in week t). Thus, the sum in the large parentheses represents the items returned in week t from purchases in weeks earlier than t.<br>Here, $\eta_i^{t,seg}$ is a binary decision variable which is 1 if backorder is being used, and 0 if back order is not being used.<br>C7' modifies C7 to use segment-wise inventory and back-order variables, $I_i^{t,seg}$ is the inventory of item "i" in customer segment "seg" at the beginning of time period "t" (i.e., the entire inventory quantity for the item), and $bo_i^{t,seg}$ is the associated segment-specific back-order variable. |
| C8: Demand calculation (demcalc) | $\forall i \in \mathbb{P}, t \in \mathbb{T}_R, seg \in \mathbb{S}$:<br>$d_i^{t,seg} \leq \overline{m}_i^{t,seg} p_i^{t,seg} + \overline{c}_i^{t,seg} + (1 - bd_i^{t,seg})M_3$<br>$d_i^{t,seg} \leq \hat{m}_i^{t,seg} p_i^{t,seg} + \hat{c}_i^{t,seg} + bd_i^{t,seg} M_3$<br>$\overline{m}_i^{t,seg} p_i^{t,seg} + \overline{c}_i^{t,seg} \leq \hat{m}_i^{t,seg} p_i^{t,seg} + \hat{c}_i^{t,seg} + bd_i^{t,seg} M_3$<br>$\hat{m}_i^{t,seg} p_i^{t,seg} + \hat{c}_i^{t,seg} \leq \overline{m}_i^{t,seg} p_i^{t,seg} + \overline{c}_i^{t,seg} \leq +(1 - bd_i^{t,seg}) M_3$<br>$\forall i \in \mathbb{P}, t \in \mathbb{T}_C$:<br>$d_i^t \leq \overline{m}_i^t pm_i^t + \overline{c}_i^t + (1 - bd_i^t) M_3$<br>$d_i^t \leq \hat{m}_i^t pm_i^t + \hat{c}_i^t + bd_i^t M_3$<br>$\overline{m}_i^t pm_i^t + \overline{c}_i^t \leq \hat{m}_i^t pm_i^t + \hat{c}_i^t + bd_i^t M_3$<br>$\hat{m}_i^t pm_i^t + \hat{c}_i^t \leq \overline{m}_i^t pm_i^t + \overline{c}_i^t + (1 - bd_i^t) M_3$ |
| C8': Demand calculation (demcalc) for Allocation Logic | $\forall i \in \mathbb{P}, t, seg \in \mathbb{S}$:<br>$d_i^{t,seg} \leq \overline{m}_i^{t,seg} p_i^{t,seg} + \overline{c}_i^{t,seg} + (1 - bd_i^{t,seg}) M_3$<br>$d_i^{t,seg} \leq \hat{m}_i^{t,seg} p_i^{t,seg} + \hat{c}_i^{t,seg} + bd_i^{t,seg} M_3$<br>$\overline{m}_i^{t,seg} p_i^{t,seg} + \overline{c}_i^{t,seg} \leq \hat{m}_i^{t,seg} p_i^{t,seg} + \hat{c}_i^{t,seg} + bd_i^{t,seg} M_3$<br>$\hat{m}_i^{t,seg} p_i^{t,seg} + \hat{c}_i^{t,seg} \leq \overline{m}_i^{t,seg} p_i^{t,seg} + \overline{c}_i^{t,seg} \leq +(1 - bd_i^{t,seg}) M_3$<br><br>Allocation Logic does not use separate constraints for $t \in \mathbb{T}_C$, and thus the t above constraints are for all t. |
| C10 Self No-Touch | $\sum_{\tau=t}^{t+S_i} \sum_{k=1}^{K} \gamma_\tau^{ik} \leq 1 \forall i, t$ |
| C11 Cross No-Touch | $\sum_{k=1}^{K} \gamma_t^{jk} + \sum_{\tau=t}^{t+S_{ij}} \sum_{k=1}^{K} \gamma_\tau^{jk} \leq 1 \forall (i, j), t \in T$ |
| C12 Must Promote | $\sum_{k=1}^{K} \gamma_t^{jk} = \sum_{k=1}^{K} \gamma_t^{jk} \forall (i, j), t \in T$ |
| C14 Inter-Item | $\sum_{k=1}^{K} \gamma_t^{jk} = \sum_{k=1}^{K} \gamma_t^{jk} \forall (i, j), t \in T$ |
| C15 Price for approximation piece | For $t \in \mathbb{T}_R$:<br>$p_{i,1}^{t,seg} + p_{i,2}^{t,seg} = p_i^{t,seg}$<br>$p_{i,1}^{t,seg} \leq P_i^{full} bd_i^{t,seg}$<br>$p_{i,2}^{t,seg} \leq P_i^{full}(1 - bd_i^{t,seg})$<br>For $t \in \mathbb{T}_C$:<br>$pm_{i,1}^t + pm_{i,2}^t = pm_i^t$<br>$pm_{i,1}^t \leq P_i^{full} bd_i^t$<br>$pm_{i,2}^t \leq P_i^{full} (1 - bd_i^t)$ |

| C#: Name (prefix) | Inequalities |
|---|---|
| C16 | For defining these constraints, define the constants |
| Only one approximation piece is active at a time | $L_i^{t,seg} = \dfrac{-2.77 - b_i^{t,seg}}{a_i^{t,seg}}$<br><br>$M_i^{t,seg} = \dfrac{2.77 - b_i^{t,seg}}{a_i^{t,seg}}$<br><br>$L_i^t = \dfrac{-2.77 - b_i^t}{a_i^t}$<br><br>$M_i^t = \dfrac{2.77 - b_i^t}{a_i^t}$<br><br>(In other words, these constants are the ones defining the range from the linearization of the logistic function.)<br>For $t \in \mathbb{T}_R$:<br>$\hat{p}_{i,1}{}^{t,seg} \leq (M_i^{t,seg} - L_i^{t,seg})bd_i^{t,seg} + L_i^{t,seg}$<br>$p_{i,1}{}^{t,seg} - (1 - bd_i^{t,seg})(M_i^{t,seg} - L_i^{t,seg}) \leq \hat{p}_{i,1}{}^{t,seg} \leq p_{i,1}{}^{t,seg} + (1 - bd_i^{t,seg})(M_i^{t,seg} - L_i^{t,seg})$<br>$\hat{p}_{i,2}{}^{t,seg} \leq (M_i^{t,seg} - L_i^{t,seg})(1 - bd_i^{t,seg}) + L_i^{t,seg}$<br>$p_{i,2}{}^{t,seg} - bd_i^{t,seg}(M_i^{t,seg} - L_i^{t,seg}) \leq \hat{p}_{i,2}{}^{t,seg} \leq p_{i,2}{}^{t,seg} + bd_i^{t,seg} (M_i^{t,seg} - L_i^{t,seg})$<br>And then the same constraints but for the $\widetilde{pm}_{i,l}^t$ variables:<br>For $t \in \mathbb{T}_C$:<br>$\widetilde{pm}_{i,1}{}^t \leq (M_i^t - L_i^t)bd_i^t + L_i^t$<br>$pm_{i,1}{}^t - (1 - bd_i^t)(M_i^t - L_i^t) \leq \widetilde{pm}_{i,1}{}^t \leq pm_{i,1}{}^t + (1 - bd_i^t)(M_i^t - L_i^t)$<br>$\widetilde{pm}_{i,2}{}^t \leq (M_i^t - L_i^t)(1 - bd_i^t) + L_i^t$<br>$pm_{i,2}{}^t - bd_i^t (M_i^t - L_i^t) \leq \widetilde{pm}_{i,2}{}^t \leq pm_{i,2}{}^t bd_i^t (M_i^t - L_i^t)$<br>In the following, define the constants |
| C17<br>Price for each approximation piece that is related to inventory tracking | $Z_{i,l}^{t,seg} = \dfrac{-\psi_{i,l}^{t,seg}}{\phi_{i,l}^{t,seg}}$, $l = 1, 2$<br><br>$Z_{i,l}^t = \dfrac{-\psi_{i,l}^t}{\phi_{i,l}^t}$, $l = 1, 2$<br><br>For $t \in \mathbb{T}_R$:<br>$Z_{i,1}{}^{t,seg} - M \cdot bd_i^{t,seg} \leq \tilde{p}_{i,1}{}^{t,seg} \leq Z_{i,1}{}^{t,seg} + M \cdot bd_i^{t,seg}$<br>$p_{i,1}{}^{t,seg} - (1 - bd_i^{t,seg})M \leq \tilde{p}_{i,1}{}^{t,seg} \leq p_{i,1}{}^{t,seg} + (1 - bd_i^{t,seg}) M$<br>$Z_{i,2}{}^{t,seg} - M \cdot (1 - bd_i^{t,seg}) \leq \tilde{p}_{i,2}{}^{t,seg} \leq Z_{i,2}{}^{t,seg} + M \cdot (1 - bd_i^{t,seg}) M$<br>$p_{i,2}{}^{t,seg} - bd_i^{t,seg} M \leq \tilde{p}_{i,2}{}^{t,seg} \leq p_{i,2}{}^{t,seg} + bd_i^{t,seg} M$<br>And then the same constraints for the $\widetilde{pm}_{i,l}^t$ variables:<br>For $t \in \mathbb{T}_C$:<br>$Z_{i,1}{}^t - M \cdot bd_i^t \leq \widetilde{pm}_{i,1}{}^t \leq Z_{i,1}{}^t + M \cdot bd_i^t$<br>$p_{i,1}{}^t - (1 - bd_i^t) M \leq \widetilde{pm}_{i,1}{}^t \leq p_{i,1}{}^t + (1 - bd_i^t) M$<br>$Z_{i,2}{}^t - M \cdot (1 - bd_i^t) \leq \widetilde{pm}_{i,2}{}^t \leq Z_{i,2}{}^t + M \cdot (1 - bd_i^t)$<br>$p_{i,2}{}^t - bd_i^t M \leq \widetilde{pm}_{i,2}{}^t \leq p_{i,2}{}^t + bd_i^t M$ |

What is claimed is:

1. A non-transitory computer readable medium having instructions stored thereon that, when executed by one or more processors, cause the processor to determine a price schedule for an item by, for each item:

receiving an electronic communication over a network from a computing device of a retailer;

determining a probability of a return of the item;

determining a cost of processing the return of the item;

determining an average time to return the item;

parsing the electronic communication to input a set of prices for the item, an inventory quantity for the item, a per-segment demand model for the item, and an objective function that is a function of the per-segment demand model and maximizes revenue based at least on the probability of the return of the item, the average time to return the item and the cost of processing the return, the objective function determining how a price change of the item affects the probability of the return of the item;

allocating the inventory quantity among a plurality of customer segments based at least on a predicted contribution of each customer segment to the objective function;

for each customer segment, based at least on a quantity of inventory allocated to the customer segment, determining by an external optimizer a promotion portion of the price schedule that maximizes the objective function, wherein the promotion portion assigns to the item a series of prices selected from the set of prices for respective time periods during a regular season for the item;

aggregating a quantity of remaining inventory allocated to the plurality of customer segments at an end of the regular season;

based at least on the aggregated inventory, determining a markdown portion of the price schedule for the item that maximizes the objective function, wherein the markdown portion assigns a series of prices selected from the set of prices for respective time periods during a clearance season for the item; and combining the promotion portion and the markdown portion to create a price schedule for the item, the price schedule decreasing the probability of the return of the item.

2. The non-transitory computer readable medium of claim 1, wherein the probability of return of the item comprises a logistic function to determine inputs $a_{i,g}^{t,seg}$ and $b_{i,g}^{t,seg}$ to determine the probability of return for item i purchased in week t at store g for price p by a customer belonging to segment seg comprising:

$$S_{i,g}^{t,seg}(p) = \frac{e^{a_{i,g}^{t,seg} p + b_{i,g}^{t,seg}}}{1 + e^{a_{i,g}^{t,seg} p + b_{i,g}^{t,seg}}},$$

wherein a logistic regression determines inputs $a_{i,g}^{t,seg}$ and $b_{i,g}^{t,seg}$ using historical data for each customer transaction comprising a date of the transaction, a basket of items the customer purchased, a store where the transaction occurred, and an identifier for the customer.

3. The non-transitory computer readable medium of claim 1, wherein the allocating the inventory quantity among customer segments comprises:

for each customer segment:
 allocating an entirety of the inventory quantity to the customer segment;
 transmitting the entirety of the inventory quantity, the set of prices, an approximate per-segment demand model, a first set of constraints, and an approximate objective function to the optimizer; and
 receiving, from the optimizer, a per segment value of the approximate objective function for the customer segment;
 computing a ratio of the per segment value to a sum of all per segment values for the customer segments;
 allocating the inventory quantity among the customer segments according to the ratio for each customer segment;
the determine the promotion portion for each customer segment comprises:
 providing the set of prices, the inventory quantity allocated to the customer segment, the approximate per-segment demand model, a second set of constraints, and the approximate objective function to the optimizer; and
 receiving, from the optimizer, a promotion portion for each customer segment that optimizes the objective function; and
the determining the markdown portion comprising:
 providing the set of prices, the aggregated inventory, an approximate aggregate demand model for the item, a third set of constraints, and the approximate objective function to the optimizer; and
 receiving, from the optimizer, a markdown portion that optimizes the objective function;

wherein the inventory quantity accounts for the probability of the return.

4. The non-transitory computer readable medium of claim 3, further comprising:

calculating a line corresponding to a linear approximation of the set of prices, wherein the line is a function of a position variable that evenly divides the line into segments between a maximum price and a minimum price, where each integer value of the position variable is associated with a price in the set of prices;

providing an equation of the line to the optimizer as the set of prices for the item; and receiving, from the optimizer, an integer value for the position variable that corresponds to a selected price; and identifying a price in the set of prices that corresponds to the position variable; and including the identified price in the price schedule for the item.

5. The non-transitory computer readable medium of claim 3, the determine the promotion portion for each customer segment comprises further comprising:

for each time period, calculating a set of customer segment demands for the item when the item is priced at respective prices in the set of prices;

calculating a plurality of lines corresponding to a piecewise linear approximation of the set of customer segment demands;

for each price, selecting a line that corresponds to a highest demand at the price; and providing an equation for the selected line to the optimizer as the approximate per-segment demand model for the price during the time period.

6. The non-transitory computer readable medium of claim 3, the determine the promotion portion for each customer segment further comprises:

for each customer segment, calculating a set of customer segment demands for the item when the item is priced at respective prices in the set of prices;

calculating a set of respective aggregate demands by aggregating respective customer segment demands for each price;

calculating a plurality of lines corresponding to a piecewise linear approximation of the set of aggregate demands;

for each price, selecting a line that corresponds to a highest demand at the price; and providing an equation for the selected line to the optimizer as the approximate aggregate demand model for the item at the price during the time period.

7. The non-transitory computer readable medium of claim 1, further comprising:

based on the price schedule, at a point of sale device providing a discount to a first customer based on determining a first customer segment that corresponds to the first customer, the determining the first customer comprising identifying the first customer, or randomly placing the first customer in one of a plurality of segments.

8. A method of determining a price schedule for an item by, for each item:

receiving an electronic communication over a network from a computing device of a retailer;

determining a probability of a return of the item;

determining a cost of processing the return of the item;

determining an average time to return the item;

parsing the electronic communication to input a set of prices for the item, an inventory quantity for the item, a per-segment demand model for the item, and an objective function that is a function of the per-segment demand model and maximizes revenue based at least on the probability of the return of the item, the average time to return the item and the cost of processing the return, the objective function determining how a price change of the item affects the probability of the return of the item;

allocating the inventory quantity among a plurality of customer segments based at least on a predicted contribution of each customer segment to the objective function, wherein the inventory quantity accounts for the probability of the return;

for each customer segment, based at least on a quantity of inventory allocated to the customer segment, determining by an external optimizer a promotion portion of the price schedule that maximizes the objective function, wherein the promotion portion assigns to the item a series of prices selected from the set of prices for respective time periods during a regular season for the item;

aggregating a quantity of remaining inventory allocated to the plurality of customer segments at an end of the regular season;

based at least on the aggregated inventory, determining a markdown portion of the price schedule for the item that maximizes the objective function, wherein the markdown portion assigns a series of prices selected from the set of prices for respective time periods during a clearance season for the item; and combining the promotion portion and the markdown portion to create a price schedule for the item, the price schedule decreasing the probability of the return of the item.

9. The method of claim 8, wherein the probability of return of the item comprises a logistic function to determine inputs $a_{i,g}^{t,seg}$ and $b_{i,g}^{t,seg}$ to determine the probability of return for item i purchased in week t at store g for price p by a customer belonging to segment seg comprising:

$$S_{i,g}^{t,seg}(p) = \frac{e^{a_{i,g}^{t,seg}p+b_{i,g}^{t,seg}}}{1+e^{a_{i,g}^{t,seg}p+b_{i,g}^{t,seg}}},$$

wherein a logistic regression determines inputs $a_{i,g}^{t,seg}$ and $b_{i,g}^{t,seg}$ using historical data for each customer transaction comprising a date of the transaction, a basket of items the customer purchased, a store where the transaction occurred, and an identifier for the customer.

10. The method of claim 8, wherein:
the allocating the inventory quantity among customer segments comprises:
for each customer segment:
allocating an entirety of the inventory quantity to the customer segment;
transmitting the entirety of the inventory quantity, the set of prices, an approximate per-segment demand model, a first set of constraints, and an approximate objective function to the optimizer; and
receiving, from the optimizer, a per segment value of the approximate objective function for the customer segment;
computing a ratio of the per segment value to a sum of all per segment values for the customer segments;
allocating the inventory quantity among the customer segments according to the ratio for each customer segment;
the determine the promotion portion for each customer segment comprises:
providing the set of prices, the inventory quantity allocated to the customer segment, the approximate per-segment demand model, a second set of constraints, and the approximate objective function to the optimizer; and
receiving, from the optimizer, a promotion portion for each customer segment that optimizes the objective function; and
the determining the markdown portion comprising:
providing the set of prices, the aggregated inventory, an approximate aggregate demand model for the item, a third set of constraints, and the approximate objective function to the optimizer; and
receiving, from the optimizer, a markdown portion that optimizes the objective function;
wherein the inventory quantity accounts for the probability of the return.

11. The method of claim 10, further comprising:
calculating a line corresponding to a linear approximation of the set of prices, wherein the line is a function of a position variable that evenly divides the line into segments between a maximum price and a minimum price, where each integer value of the position variable is associated with a price in the set of prices;
providing an equation of the line to the optimizer as the set of prices for the item; and
receiving, from the optimizer, an integer value for the position variable that corresponds to a selected price; and
identifying a price in the set of prices that corresponds to the position variable; and
including the identified price in the price schedule for the item.

12. The method of claim 10, the determine the promotion portion for each customer segment comprises further comprising:
for each time period, calculating a set of customer segment demands for the item when the item is priced at respective prices in the set of prices;
calculating a plurality of lines corresponding to a piecewise linear approximation of the set of customer segment demands;
for each price, selecting a line that corresponds to a highest demand at the price; and
providing an equation for the selected line to the optimizer as the approximate per-segment demand model for the price during the time period.

13. The method of claim 10, the determine the promotion portion for each customer segment further comprises:
for each customer segment, calculating a set of customer segment demands for the item when the item is priced at respective prices in the set of prices;
calculating a set of respective aggregate demands by aggregating respective customer segment demands for each price;
calculating a plurality of lines corresponding to a piecewise linear approximation of the set of aggregate demands;
for each price, selecting a line that corresponds to a highest demand at the price; and providing an equation for the selected line to the optimizer as the approximate aggregate demand model for the item at the price during the time period.

14. The method of claim 8, further comprising:
based on the price schedule, at a point of sale device providing a discount to a first customer based on determining a first customer segment that corresponds to the first customer, the determining the first customer comprising identifying the first customer, or randomly placing the first customer in one of a plurality of segments.

15. A price optimization system that determines a price schedule for an item comprising:
one or more processors executing stored instructions to implement functionality comprising:
receiving an electronic communication over a network from a computing device of a retailer;
determining a probability of a return of the item;
determining a cost of processing the return of the item;
determining an average time to return the item;
parsing the electronic communication to input a set of prices for the item, an inventory quantity for the item, a per-segment demand model for the item, and an objective function that is a function of the per-segment demand model and maximizes revenue based at least on the probability of the return of the item, the average time to return the item and the cost of processing the return, the objective function determining how a price change of the item affects the probability of the return of the item;
allocating the inventory quantity among a plurality of customer segments based at least on a predicted contribution of each customer segment to the objective function, wherein the inventory quantity accounts for the probability of the return;
for each customer segment, based at least on a quantity of inventory allocated to the customer segment, determining by an external optimizer a promotion portion of the price schedule that maximizes the objective function, wherein the promotion portion assigns to the item a series of prices selected from the set of prices for respective time periods during a regular season for the item;
aggregating a quantity of remaining inventory allocated to the plurality of customer segments at an end of the regular season;
based at least on the aggregated inventory, determining a markdown portion of the price schedule for the item that maximizes the objective function, wherein the markdown portion assigns a series of prices selected from the set of prices for respective time periods during a clearance season for the item; and
combining the promotion portion and the markdown portion to create a price schedule for the item, the price schedule decreasing the probability of the return of the item.

16. The price optimization system of claim 15, wherein the probability of return of the item comprises a logistic function to determine inputs $a_{i,g}^{t,seg}$ and $b_{i,g}^{t,seg}$ to determine the probability of return for item i purchased in week t at store g for price p by a customer belonging to segment seg comprising:

$$S_{i,g}^{t,seg}(p) = \frac{e^{a_{i,g}^{t,seg}p+b_{i,g}^{t,seg}}}{1+e^{a_{i,g}^{t,seg}p+b_{i,g}^{t,seg}}},$$

wherein a logistic regression determines inputs $a_{i,g}^{t,seg}$ and $b_{i,g}^{t,seg}$ using historical data for each customer transaction comprising a date of the transaction, a basket of items the customer purchased, a store where the transaction occurred, and an identifier for the customer.

17. The price optimization system of claim 15, wherein the allocating the inventory quantity among customer segments comprises:
for each customer segment:
allocating an entirety of the inventory quantity to the customer segment;
transmitting the entirety of the inventory quantity, the set of prices, an approximate per-segment demand model, a first set of constraints, and an approximate objective function to the optimizer; and
receiving, from the optimizer, a per segment value of the approximate objective function for the customer segment;
computing a ratio of the per segment value to a sum of all per segment values for the customer segments;
allocating the inventory quantity among the customer segments according to the ratio for each customer segment;
the determine the promotion portion for each customer segment comprises:
providing the set of prices, the inventory quantity allocated to the customer segment, the approximate per-segment demand model, a second set of constraints, and the approximate objective function to the optimizer; and
receiving, from the optimizer, a promotion portion for each customer segment that optimizes the objective function; and
the determining the markdown portion comprising:
providing the set of prices, the aggregated inventory, an approximate aggregate demand model for the item, a third set of constraints, and the approximate objective function to the optimizer; and
receiving, from the optimizer, a markdown portion that optimizes the objective function;
wherein the inventory quantity accounts for the probability of the return.

18. The price optimization system of claim 17, further comprising:
calculating a line corresponding to a linear approximation of the set of prices, wherein the line is a function of a position variable that evenly divides the line into segments between a maximum price and a minimum price, where each integer value of the position variable is associated with a price in the set of prices;
providing an equation of the line to the optimizer as the set of prices for the item; and
receiving, from the optimizer, an integer value for the position variable that corresponds to a selected price; and
identifying a price in the set of prices that corresponds to the position variable; and
including the identified price in the price schedule for the item.

19. The price optimization system of claim 17, the determine the promotion portion for each customer segment comprises further comprising:
for each time period, calculating a set of customer segment demands for the item when the item is priced at respective prices in the set of prices;

calculating a plurality of lines corresponding to a piecewise linear approximation of the set of customer segment demands;
for each price, selecting a line that corresponds to a highest demand at the price; and
providing an equation for the selected line to the optimizer as the approximate per-segment demand model for the price during the time period.

20. The price optimization system of claim 15, further comprising:
based on the price schedule, at a point of sale device providing a discount to a first customer based on determining a first customer segment that corresponds to the first customer, the determining the first customer comprising identifying the first customer, or randomly placing the first customer in one of a plurality of segments.

\* \* \* \* \*